(12) United States Patent
Miyazawa

(10) Patent No.: US 7,105,984 B2
(45) Date of Patent: Sep. 12, 2006

(54) DRIVE UNIT AND AN OPERATING APPARATUS

(76) Inventor: Osamu Miyazawa, c/o Seiko Epson Corporation, 3-5, Owa 3-chome, Suwa-shi, Nagano-ken 392-8502 (JP)

( * ) Notice: Subject to any disclaimer, the term of this patent is extended or adjusted under 35 U.S.C. 154(b) by 140 days.

(21) Appl. No.: 10/774,361

(22) Filed: Feb. 6, 2004

(65) Prior Publication Data

US 2004/0212278 A1 Oct. 28, 2004

(30) Foreign Application Priority Data

Feb. 6, 2003 (JP) .............................. 2003-030139
Dec. 12, 2003 (JP) .............................. 2003-415312

(51) Int. Cl.
*H01L 41/08* (2006.01)

(52) U.S. Cl. ................................. 310/323.02
(58) Field of Classification Search .......... 310/323.02, 310/323.12, 323.16

See application file for complete search history.

(56) References Cited

U.S. PATENT DOCUMENTS 5,696,421 A * 12/1997 Zumeris et al. ............. 310/328
6,064,140 A * 5/2000 Zumeris .................. 310/323.02
6,121,717 A * 9/2000 Diefenbach et al. ... 310/323.02
6,242,850 B1 * 6/2001 Slutskiy et al. ............. 310/328
6,870,304 B1 * 3/2005 Magnussen et al. ... 310/323.02
6,885,615 B1 * 4/2005 Miyazawa et al. ..... 310/323.01

FOREIGN PATENT DOCUMENTS

JP 08-237971 9/1996
JP 11-187678 7/1999

* cited by examiner

*Primary Examiner*—Darren Schuberg
*Assistant Examiner*—Karen Beth Addison
(74) *Attorney, Agent, or Firm*—Harness, Dickey & Pierce, P.L.C.

(57) ABSTRACT

A present invention provides a drive unit and an operating apparatus each having a simple structure and therefore having an advantage to be miniaturized, which can obtain a large drive torque. A drive unit 1 of the present invention includes a rotor 4 and a plurality of actuators 5A, 5B for driving the rotor 4. Each of the plurality of actuators 5A, 5B includes an electro-mechanical converting element which applies driving force to the rotor 4 when electric power is applied thereto. In this case, the rotor 4 is driven in a cooperation manner in which the plurality of actuators 5A, 5B are cooperatively driven. Further, the electro-mechanical converting element is a vibrating element 50 containing a piezoelectric element.

10 Claims, 13 Drawing Sheets

DRIVE UNIT AND AN OPERATING APPARATUS

TECHNICAL FIELD

The present invention is related to a drive unit and an operating apparatus.

BACKGROUND ART

So far, a drive unit using an ultrasonic motor as a drive source has been known as a drive unit using for driving a displacing element (driven element) that carries out a linear motion or a rotary motion.

This drive unit is adapted so as to transmit a vibration of a vibrating element which is excited by applying an AC voltage to a driven element, and hereby to displace (move) the driven element along a guide (for example, see Japanese Laid-Open Patent Publication No. HEI. 11-187678).

However, since the conventional drive unit includes only one ultrasonic motor, it is impossible to obtain enough drive torque.

Further, shakiness easily arises due to backlash or the like at a normal drive time, normal-reverse converting time, or the like, for example. Thus, this may make it impossible to move (displace) the driven element toward a target position accurately.

SUMMARY OF THE INVENTION

It is an object of the present invention to provide a drive unit and an operating apparatus each having a simple structure and therefore having an advantage to be miniaturized, which can obtain a large drive torque.

In order to achieve the above-mentioned object, in one aspect, the present invention is directed to a drive unit. The drive unit of the present invention comprises:

a driven element; and a plurality of actuators for driving the driven element, each of the plurality of actuators comprising an electro-mechanical converting element which applies driving force to the driven element when electric power is applied thereto, wherein the driven element is driven by cooperatively driving the plurality of actuators.

This makes it possible to miniaturize (make thinner) the entire unit and make its weight lighter. Further, it is possible to obtain a large drive torque. Therefore, it is possible to select and adjust the drive torque in response to increase in a load (required driving force) easily and surely.

It is preferable that the electro-mechanical converting element is a vibrating element containing a piezoelectric material.

This further makes it possible to miniaturize (make thinner) the entire unit and make its weight lighter. Also, it is possible to obtain a larger drive torque.

It is preferable that the vibrating element in at least one of the plurality of actuators is provided in abutment with the driven element so that the vibrating element applies force to the driven element by means of vibration thereof to drive the driven element directly.

This makes it possible to reduce the number of components, and simplify the structure of the drive unit, and further to reduce a production cost of the drive unit.

It is preferable that at least one of the plurality of actuators drives the driven element indirectly.

This makes it possible to choose various designs, thereby expanding its versatility.

It is preferable that the drive unit further comprises at least one moving element which works with the driven element and is in abutment with the vibrating element of the actuator wherein the vibrating element applies force to the moving element by means of vibration thereof so as to drive the moving element and thereby drive the driven element indirectly.

This makes it possible to choose various designs, thereby expanding its versatility.

It is preferable that the moving element is a rotor provided rotatably.

This makes it possible to operate the drive unit smoothly.

It is preferable that the drive unit further comprises at least one decelerator provided in a power transmission path between the at least one moving element and the driven element.

This makes it possible to obtain a further large drive torque.

It is preferable that each actuator is an electromagnetic motor mechanism and the electro-mechanical converting element is an excited coil.

Further, it is preferable that the driven element is a rotor provided rotatably.

This makes it possible to operate the drive unit smoothly.

It is preferable that the cooperative driving motion of the actuators includes at least one of a first mode in which at least two of the plurality of actuators are synchronized to drive the driven element, a second mode in which the driven element is driven with a phase difference between at least two of the plurality of actuators, and a third mode in which at least two of the plurality of actuators are driven in a differential manner to drive the driven element.

In the case where the actuators are synchronized to drive the driven element, it is possible to increase the drive torque based on the number of the actuators.

Further, in the case where the driven element is driven with the phase difference, it is possible to compensate (increase) the drive torque. In other words, by driving one of the actuators with the different phase even though the drive torque of the other actuator reaches the limiting value, it is possible to compensate the drive torque.

Moreover, in the case where the actuators carry out a differential manner with each other, the countervailing power is generated between the actuators. Therefore, it is possible to prevent shakiness due to backlash or the like (for example, shakiness during a normal drive or shakiness at normal-reverse converting time). Further, it is also possible to move (for example, rotatively move or linearly move) the driven element toward a target position accurately.

In this case, it is preferable that the differential manner includes at least one of three modes which includes a first mode in which at least two of the plurality of actuators respectively have drive speeds that are different from each other to drive the driven element in one direction, a second mode in which at least one of the plurality of actuators is driven in the direction reverse to the drive direction of the driven element, and a third mode in which at least one of the plurality of actuators is in a non-driving state.

In the case where the actuators respectively have drive speeds that are different from each other to drive the driven element in a same direction, the countervailing power is generated between the corresponding actuators. Therefore, it is possible to prevent shakiness due to backlash or the like. Further, it is also possible to move the driven element toward a target position accurately.

Further, in the case where at least one of the plurality of actuators is driven in the direction reverse to the drive direction of the driven element, the countervailing power is generated between the corresponding actuators. Therefore, it is possible to decelerate or brake (stop) the movement of the driven element easily and surely. It is also possible to prevent shakiness due to backlash or the like. Further, it is possible to move the driven element toward a target position accurately.

Moreover, in the case where at least one of the plurality of actuators is in a non-driving state, the countervailing power is generated between the corresponding actuators. Therefore, it is possible to prevent shakiness due to backlash or the like. Further, it is also possible to move the driven element toward a target position accurately.

It is preferable that the drive unit is constructed so that, when the driven element is to be stopped, at least two of the plurality of actuators are driven in the differential manner thereby stopping the actuators.

This causes the countervailing power to be generated between the corresponding actuators. Therefore, it is possible to prevent shakiness due to backlash or the like. Further, it is also possible to move the driven element toward a target position accurately.

It is preferable that the plurality of actuators includes a main actuator having a high output characteristic and a sub actuator having a low output characteristic, and the drive unit is constructed so that, in the third mode, the main and sub actuators are driven in the differential manner to drive the driven element.

This causes the countervailing power to be generated between the main and sub actuators. Therefore, it is possible to prevent shakiness due to backlash or the like. Further, it is also possible to move the driven element toward a target position accurately.

It is preferable that at least one of the plurality of actuators has an output characteristic different from that of each of the other actuators.

This makes it possible to choose various designs, thereby expanding its versatility.

In another aspect, a drive unit of the present invention comprises:
at least two driven elements; and
a plurality of actuators for driving the driven elements, respectively, each of the plurality of actuators comprising an electro-mechanical converting element which applies driving force to the driven element when electric power is applied thereto, wherein the driven elements are driven by cooperatively driving the plurality of actuators.

This makes it possible to miniaturize (make thinner) the entire unit and make its weight lighter. Further, it is possible to obtain a large drive torque. Therefore, it is possible to select and adjust the drive torque in response to increase in a load (required driving force) easily and surely.

It is preferable that each of the plurality of actuators drives one of the driven elements.

This makes it possible to easily respond to the case where the load (required driving force) increases.

In yet another aspect, the present invention is directed to an operating apparatus. The operating apparatus comprises:
a drive unit which comprises:
a driven element; and
a plurality of actuators for driving the driven element, each of the plurality of actuators comprising an electro-mechanical converting element which applies driving force to the driven element when electric power is applied thereto, wherein the driven element is driven by cooperatively driving the plurality of actuators; and
a controlled element driven by the drive unit in a controlled manner.

This makes it possible to miniaturize (make thinner) the entire apparatus and make its weight lighter. Further, it is possible to obtain a large drive torque. Therefore, it is possible to select and adjust the drive torque in response to increase in a load (required driving force) easily and surely.

It is preferable that the controlled element includes a robot arm body.

In a still another aspect, an operating apparatus of the present invention comprises:
a drive unit which comprises:
at least two driven elements; and
a plurality of actuators for driving the driven elements, respectively, each of the plurality of actuators comprising an electro-mechanical converting element which applies driving force to the driven element when electric power is applied thereto, wherein the driven elements are driven by cooperatively driving the plurality of actuators; and
a controlled element driven by the drive unit in a controlled manner.

It is preferable that the controlled element includes a robot arm body.

BRIEF DESCRIPTION OF THE DRAWINGS

The preferred embodiments of a drive unit and an operating apparatus are described below with reference to the appended drawings.

PREFERRED EMBODIMENTS OF THE INVENTION

The preferred embodiments of a drive unit and an operating apparatus of the present invention will be described below with reference to the appended drawings.

First Embodiment

A case of applying the drive unit of the present invention to a drive unit for a robot arm, namely, a case of applying the operating apparatus of the present invention to the robot arm will be described as an example.

Figure 1:
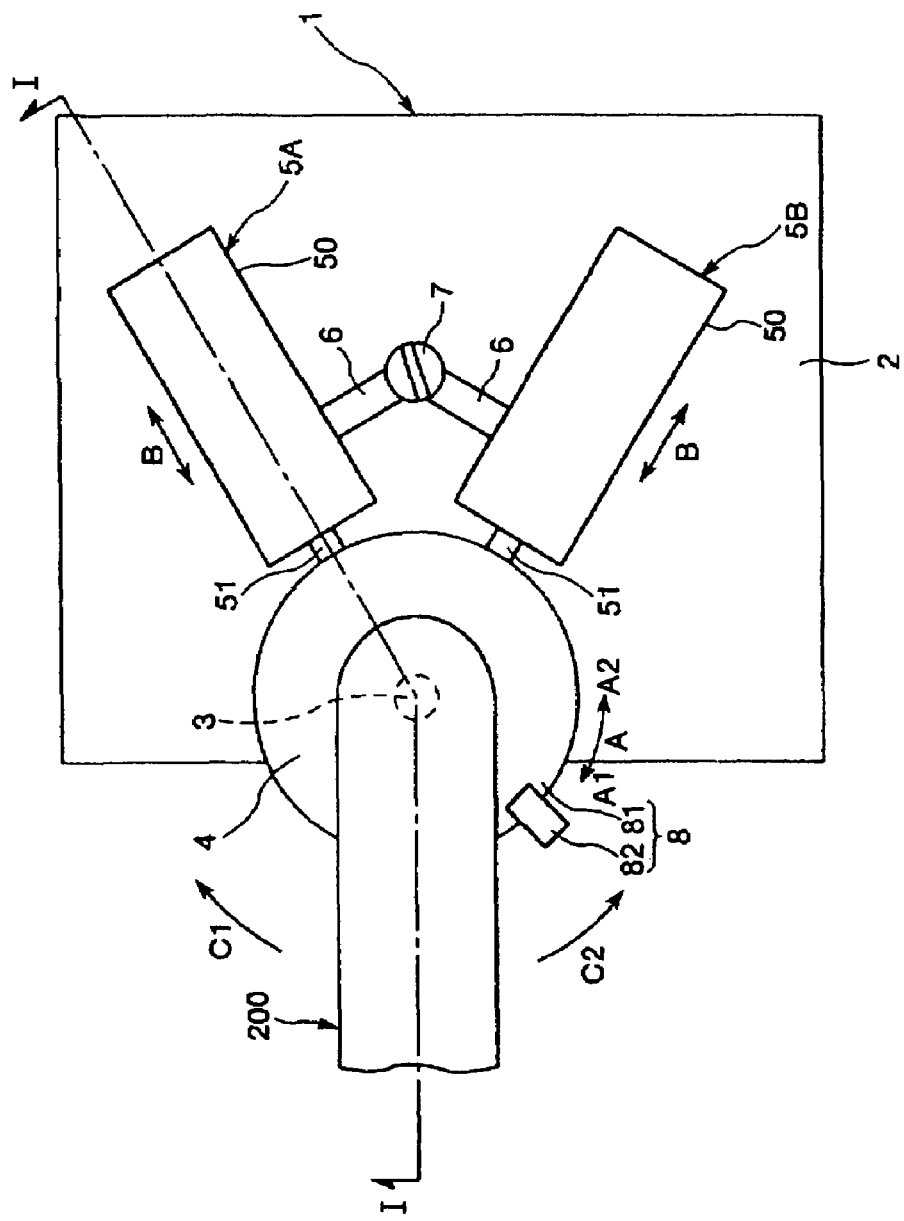
FIG. 1 is a plan view illustrating a first embodiment of the drive unit according to the present invention.
Figure 2:
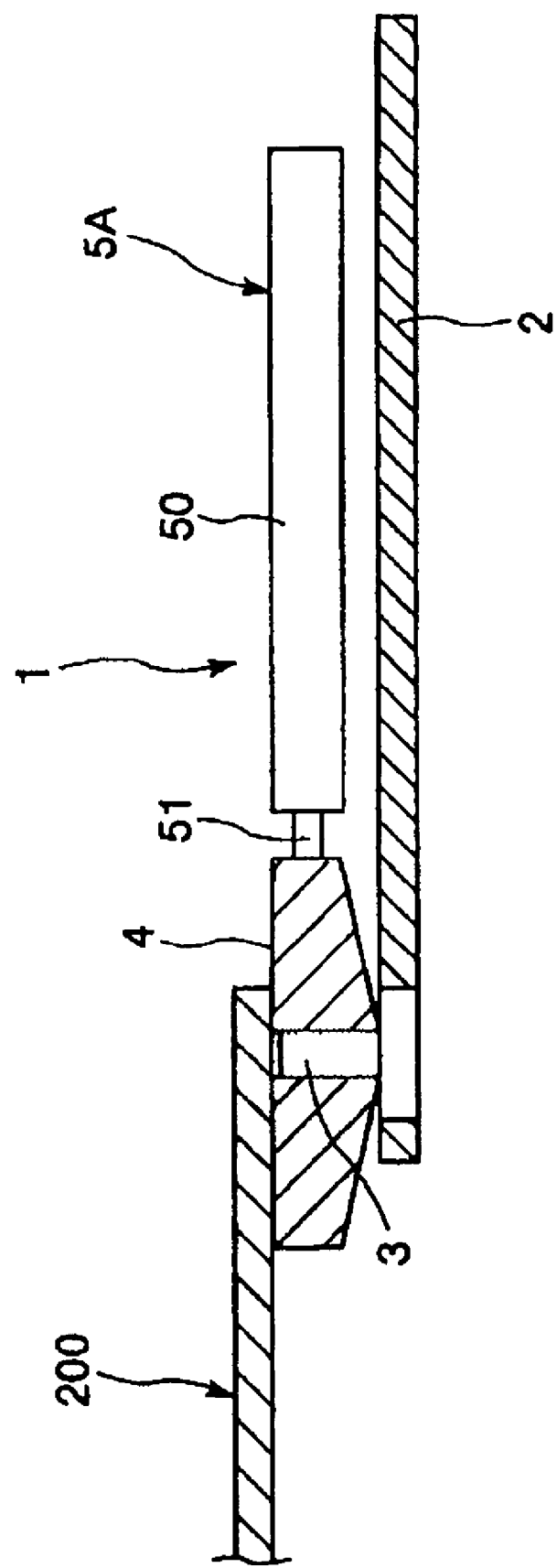
FIG. 2 is a cross-sectional view taken along the line I—I of the drive unit shown in FIG. 1.
Figure 3:
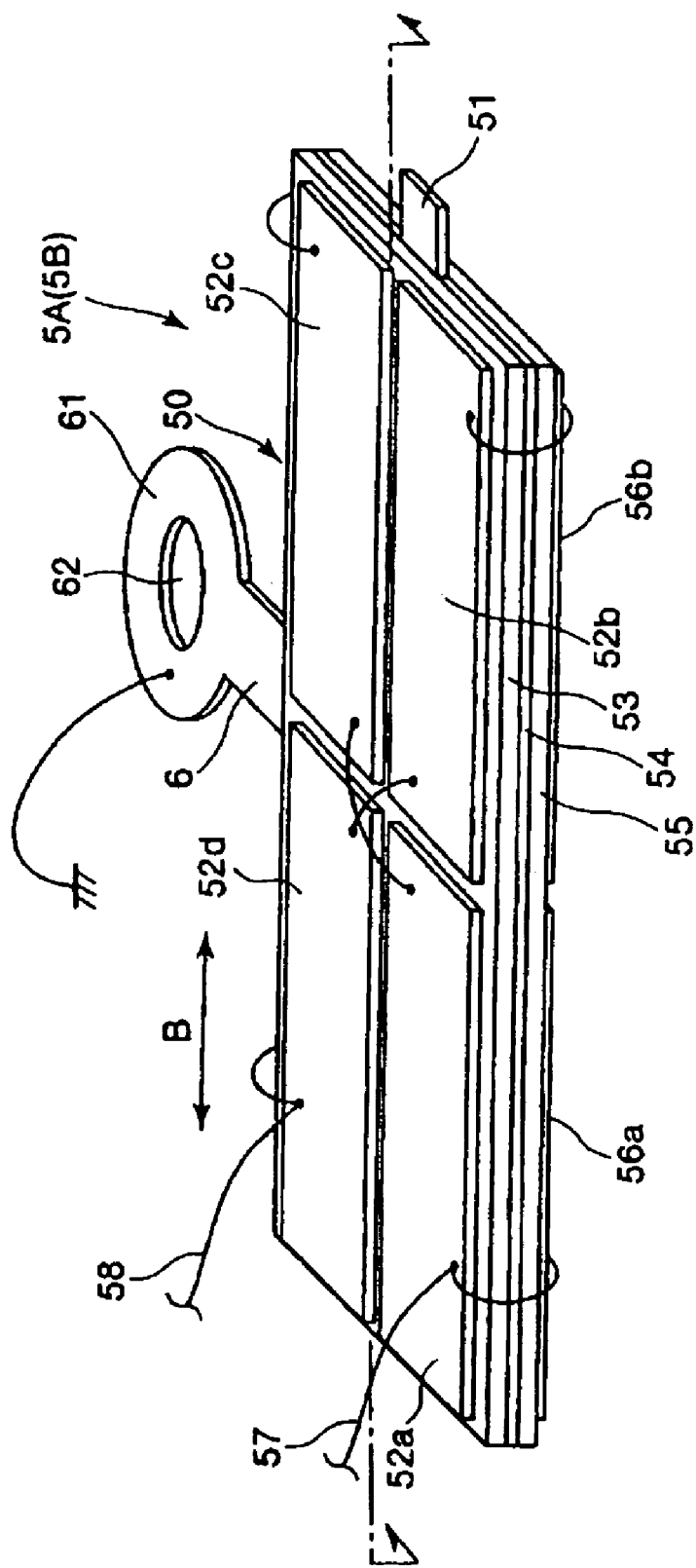
FIG. 3 is a perspective view of a vibrating element constituting an actuator.
Figure 4:
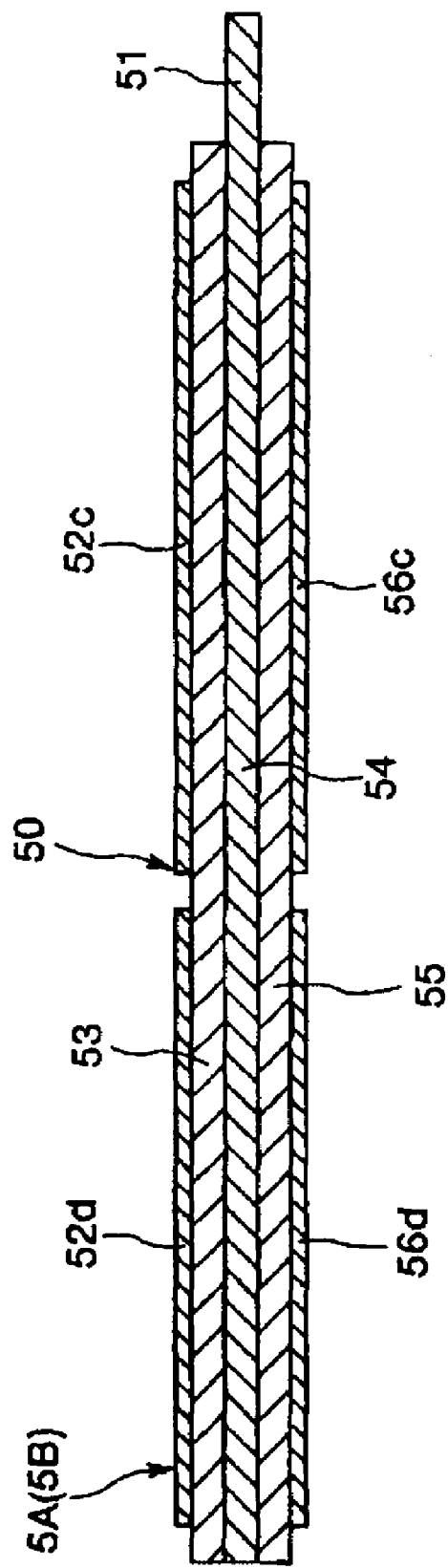
FIG. 4 is a cross-sectional view taken along the line II—II of the vibrating element shown in FIG. 3.

FIG. 1 is a plan view illustrating a first embodiment of the drive unit according to the present invention. FIG. 2 is a cross-sectional view taken along the line I—I of the drive unit shown in FIG. 1. FIG. 3 is a perspective view of a vibrating element constituting an actuator. FIG. 4 is a cross-sectional view taken along the line II—II of the vibrating element shown in FIG. 3.

As shown in FIGS. 1 and 2, a drive unit 1 has a plate-shaped base (substrate) 2, and a rotor (driven element) 4 constituting an arm elbow portion in a simplified robot, for example, which is rotatably provided in both normal and reverse directions with respect to the center of a shaft 3 on the plane of the base 2. One end of a robot arm body (controlled element) 200 is attached (fixed) on the rotor 4, and the robot arm body 200 rotates around the shaft 3 integrally with the rotor 4. A robot arm is constituted from the robot arm body 200 and the drive unit 1.

A first actuator 5A and a second actuator 5B are placed on the outer circumferential surface of the rotor 4. Hereinafter, the "first actuator" or the "second actuator" is referred to simply as an "actuator."

The first and second actuators 5A and 5B rotate (or control) the rotation of the single (common) rotor 4 in a rotational direction A (A1 or A2) around the shaft 3 by cooperatively driving the actuators.

In this regard, the term "by cooperatively driving (cooperative driving of actuators)" means that the first and second actuators 5A and 5B are mutually related (namely, they have a predetermined relationship). For example, a case in which the first and second actuators 5A and 5B are synchronized to rotational-drive the rotor 4 (drive the driven element), a case in which there is a phase difference between the first and second actuators 5A and 5B to drive the rotor 4, a case in which the first and second actuators 5A and 5B carry out a differential manner (differential motion) each other to drive the rotor 4, and the like are taken as examples.

In this case, as examples of "differential motion (differential manner)," a case in which the first and second actuators 5A and 5B respectively have drive speeds that are different from each other to drive the rotor 4 in a same direction, a case in which one of the first and second actuators 5A and 5B is driven in the direction reverse to the rotational direction (drive direction) of the rotor 4, a case in which one of the first and second actuators 5A and 5B is in a non-driving state (resting state), and the like are taken.

Installing arms (arm portions) 6 are protrudely provided on the first and second actuators 5A and 5B, respectively. These installing arms 6 are fastened on the plate of the base 2 by a bolt 7 each other, thereby holding the actuators 5A and 5B. The actuators 5A and 5B are arranged along an outer circumferential surface (in the circumferential direction) of the rotor 4.

Each of the actuators 5A and 5B is constituted from, for example, a vibrating element (electro-mechanical converting element) 50 having a rectangular plate shape. A protruding portion 51 as a vibration transmission element (described later) is arranged on the vibrating element 50 so as to protrude toward the rotor 4. The protruding portion 51 slidably abuts on the outer circumferential surface (abutting portion) of the rotor 4 in a pressure-pushing state.

The protruding portion 51 can slide on the outer circumferential surface of the rotor 4. Thus, the protruding portion 51 and the rotor 4 constitute a slide mechanism. This constitution of the slide mechanism makes it possible to prevent breakage due to application of an over load.

The components of the rotor 4 and the actuators 5A, 5B are unitized on the base 2 to be assembled. Each of the actuators 5A and 5B is arranged substantially on a same plane. This makes it possible to miniaturize the entire unit, in particular, make its thickness and weight thinner and lighter, respectively.

Further, a rotary encoder 8 is arranged on the outer circumferential portion of the rotor 4 as a rotational amount detecting means (or displacing amount detecting means) for detecting the rotational amount (or displacing amount) of the rotor 4.

As shown in FIGS. 3 and 4, the vibrating element 50 constituted by orderly laminating: four first electrodes 52a, 52b, 52c, and 52d; a first piezoelectric element 53; a reinforcing plate (simultaneously serving as a vibrating plate) 54; a second piezoelectric element 55; and four second electrodes 56a, 56b, 56c, and 56d. In this case, the first electrodes 52a–52d and the second electrodes 56a–56d are arranged so that the first electrodes 52a–52d are respectively opposed to the second electrodes 56a–56d.

The first electrodes 52a, 52c and the second electrodes 56a, 56c are electrically connected in series each other, thereby constituting first group electrodes 57. Similarly, the first electrodes 52b, 52d and the second electrodes 56b, 56d are electrically connected in series each other, thereby constituting second group electrodes 58. The first and second group electrodes 57 and 58 are connected to a drive control circuit (described later).

The first and second piezoelectric elements 53 and 55 are respectively disposed (fixed) on both faces of the reinforcing plate 54. The first and second piezoelectric elements 53 and 55 undergo expansion and contraction in the longitudinal directions B of the first and second piezoelectric elements 53 and 55 that are rectangular by applying an AC voltage to the elements 53 and 55.

Material to constitute the piezoelectric elements 53, 55 is not especially limited. For example, it is possible to suitably use various kinds of materials such as lead zirconate titanate (PZT), quartz crystal, lithium niobate, barium titanate, lead titanate, lead meta-niobate, polyvinylidene fluoride, zinc lead niobate, scandium lead niobate, and the like.

Frequency of the AC voltage to be applied to the first and second piezoelectric elements 53, 55 of the vibrating element 50 is not especially limited. However, it is preferable that the frequency of the AC voltage is substantially the same as the resonance frequency of vibration (vertical vibration) of the vibrating element 50. Hereby, the amplitude of the vibrating element 50 becomes greater, and this makes it possible to drive the rotor 4 with high efficiency.

A detailed description is given for the vibrating element 50. The first piezoelectric element 53 is substantially equally divided (partitioned) into four rectangular areas, and the first electrodes 52a, 52b, 52c, and 52d are respectively provided at the divided areas. Likewise, the second element 55 is substantially equally divided (partitioned) into four rectangular areas, and the second electrodes 56a, 56b, 56c, and 56d are respectively provided at the divided areas so that the second electrodes 56a–56d are symmetrically arranged against the first electrodes 52a–52d in an upper-and-lower direction in FIGS. 3 and 4.

The reinforcing plate 54 interposed between the first and second piezoelectric elements 53 and 55 has a function to reinforce the entire vibrating element 50, thereby preventing the vibrating element 50 from being injured due to over-vibration of the vibrating element 50, external force or the like. Material to constitute the reinforcing plate 54 is not especially limited. However, it is preferable that the material is a kind of metal material such as stainless steel, aluminum or aluminum alloy, titan or titan alloy, and copper or copper system alloy and the like, which has an elastic characteristic.

Further, the reinforcing plate 54 functions as a common electrode for the first and second piezoelectric elements 53 and 55. In this regard, the reinforcing plate 54 is connected to ground.

The protruding portion (abutting portion) 51 is integrally formed on the reinforcing plate 54.

It is preferable that the thickness of the reinforcing plate 54 is thinner than that of the first or second piezoelectric element 53, 55. This makes it possible to vibrate the vibrating element 50, i.e., the protruding portion 51 with high efficiency.

In this regard, when an AC voltage from the first or second group electrodes 57, 58 is applied to the first and second piezoelectric elements 53 and 55 via the reinforcing plate 54, the first and second piezoelectric elements 53 and 55 undergo bending vibration in their predetermined directions, respectively. The reinforcing plate 54 also undergoes bending vibration with the bending vibration of the first and second piezoelectric elements 53 and 55, whereby the protruding portion 51 undergoes back-and-forth vibration (reciprocates) in a slanting direction against a longitudinal direction B or vibrates (moves) in an elliptical manner. At this time, the first or second group electrodes 57, 58 that are in non-driving state (inactivated state) are used as vibration detecting means as described later.

The installing arm 6 of the vibrating element 50 is integrally formed on the reinforcing plate 54 in a similar manner as the protruding portion 51. A bolt inserting aperture 62 through which a bolt 7 is inserted is provided on an installing base portion 61 that is at a tip end side of the installing arm 6. The installing arm 6 is fixed on the face of the base 2 using the bolt 7, whereby the vibrating element 50 is held (supported), and the protruding portion 51 resiliently (elastically) comes into contact with (abuts on) the outer circumferential surface of the rotor 4 in a pressure-pushing state by means of the resilience of the installing arm 6.

Here, the "electro-mechanical converting element" means an element which applies driving force by supplying (applying) an electric energy (electric power) to the element such as an element having a member (portion) which undergoes transformation by supplying an electric energy, an element which generates a magnetic field to be used for displacing a displaced element (for example, rotating, moving, shifting, or the like) by supplying an electric energy, or the like. The element having a member which undergoes transformation by supplying an electric energy is preferable within the above-mentioned types.

In this regard, a vibrating element containing a piezoelectric element (piezoelectric material) is used as the electro-mechanical converting element in this embodiment, but the present invention is not limited to this type. For example, a shape-memory element, a magnetostrictive element, an artificial muscle, an element using electrostatic force, an exiting coil and the like, or an element having at least one of these elements, and the like are taken as other electro-mechanical converting element.

Figure 5:
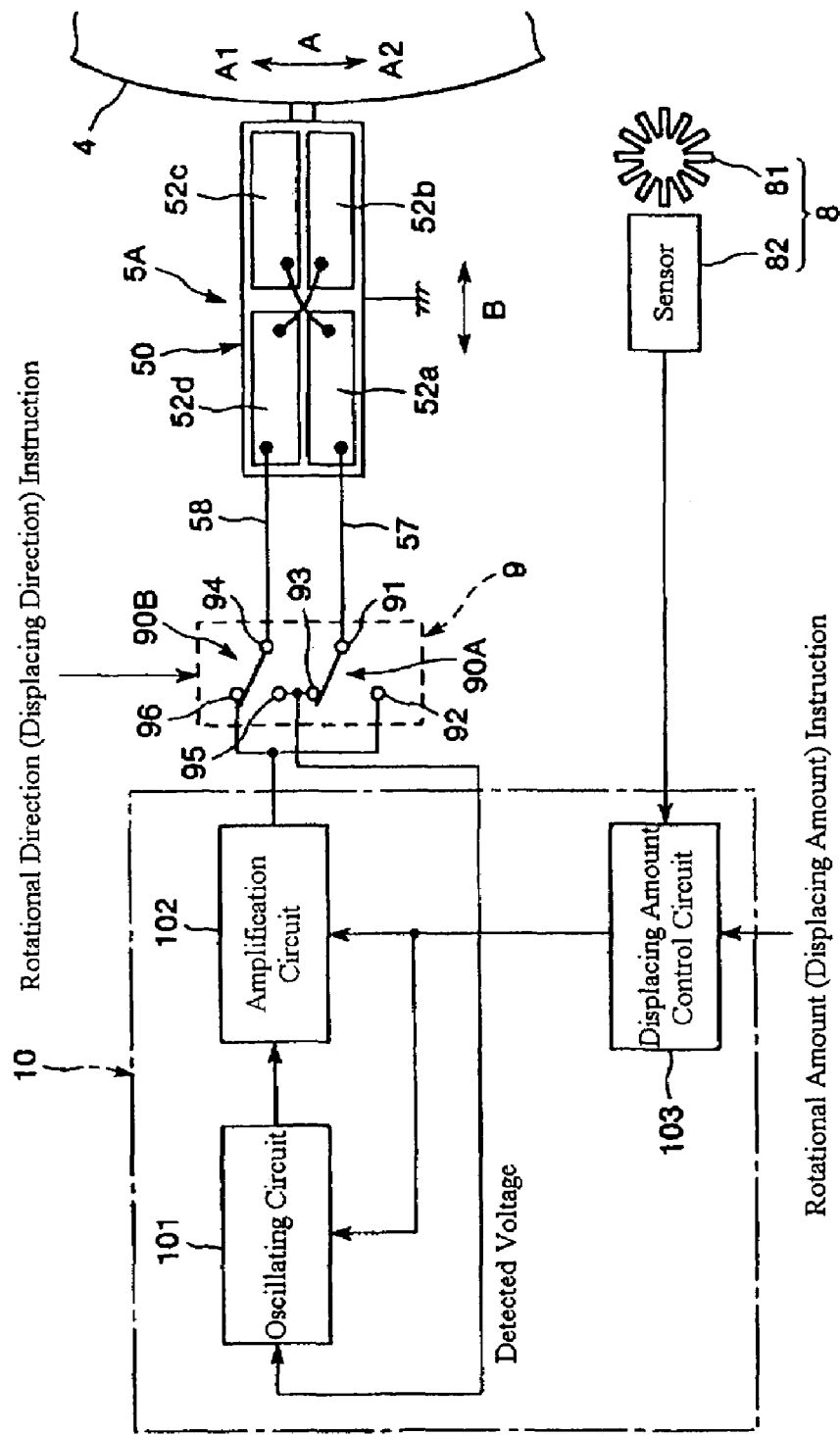
FIG. 5 is a block diagram illustrating an example of a configuration of a drive control circuit for an actuator.

FIG. 5 is a block diagram illustrating an example of a configuration of a drive control circuit for an actuator.

In this case, since the constitution (structure) of a drive control circuit of the first actuator 5A is the same as that of a drive control circuit of the second actuator 5B, a description is given for one circuit as a representative of the drive control circuits here.

The drive control circuit is constituted from a switching circuit 9 connected to the vibrating element 50 and a drive circuit 10. The switching circuit 9 has a first transfer switch portion 90A and a second transfer switch portion 90B, which are cooperative with each other.

The first transfer switch portion 90A has a terminal 91 to which the first group electrodes 57 of the vibrating element 50 are connected, and a pair of switching terminals 92, 93. Similarly, the second transfer switch portion 90B has a terminal 94 to which the second group electrodes 58 of the vibrating element 50 are connected, and a pair of switching terminals 95, 96.

Thus, the switching circuit 9 switches between the group electrodes to which an AC voltage is applied whereby the first and second piezoelectric elements 53, 55 undergo bending vibration and the group electrodes to be used as vibration detecting means by maintaining them in a non-driving state.

On the other hand, a drive circuit 10 comprises an oscillating circuit 101, an amplification circuit 102, and a displacing amount control circuit 103. An input side of the oscillating circuit 101 is connected to both the switching terminal 93 of the first transfer switch portion 90A and the switching terminal 95 of the second transfer switch portion 90B. Further, an output side of the amplification circuit 102 is connected to both the switching terminal 92 of the first transfer switch portion 90A and the switching terminal 96 of the second transfer switch portion 90B.

A rotational direction (displacing direction) A of the rotor 4 is instructed (i.e., an instruction for a rotational direction is inputted) to the switching circuit 9. The switching circuit 9 selectively switches between the first group electrodes 57 and the second group electrodes 58 of the vibrating element 50 based on the instructed information of the rotational direction A for the rotor 4, thereby conducting to the switched group electrodes. Thus, an AC voltage is applied to the first and second piezoelectric elements 53, 55 via the oscillating circuit 101 and the amplification circuit 102, whereby the first and second piezoelectric elements 53, 55 and the reinforcing plate 54 undergo bending vibration in a predetermined direction, and the protruding portion 51 undergoes back-and-forth vibration (reciprocates) in a slanting direction against a longitudinal direction B or vibrates (moves) in an elliptical manner.

By the vibration of the protruding portion 51, force (pushing force or frictional forced) is applied to the rotor 4, whereby the rotor 4 is rotatively driven. The rotational direction A of the rotor 4 can be switched between a normal direction (in a clockwise direction) A1 and a reverse direction (counterclockwise) A2 in response to the switch between the first group electrodes 57 and the second group electrodes 58 by means of the first transfer switch portion 90A and the second transfer switch portion 90B.

A rotary encoder 8 provided on the outer circumferential portion of the rotor 4 as displacing amount detecting means is connected to the displacing amount control circuit 103. The rotary encoder 8 is constituted from a slit rotating plate 81 formed with a plurality of slits in constant intervals, and a sensor 82 having a light emitting portion and a light receiving portion. The slit rotating plate 81 rotates together with the rotor 4.

In this case, for example, a photoreflector, a photointerrupter, or the like is suitably used as the sensor 82. The photoreflector is constituted from a light emitting element which emits light toward the outer circumferential portion of the slit rotating plate 81, and a light receiving element (opto-electric converting element) which receives the light (reflected light) reflected on the slit rotating plate 81. On the other hand, the photointerrupter is constituted from a light emitting element which emits light toward the outer circumferential portion of the slit rotating plate 81, and a light receiving element (opto-electric converting element) which receives the light (transmitted light) penetrating the slit rotating plate 81.

A target rotational amount (displacing amount) of the rotor 4 is instructed (i.e., an instruction for a rotational amount is inputted) to the displacing amount control circuit 103 in advance. The slit rotating plate 81 of the rotary encoder 8 rotates together with the rotor 4. The rotational amount of the slit rotating plate 81 corresponds to that of the rotor 4. A pulse signal corresponding to the rotational amount of the slit rotating plate 81 is outputted from the sensor 82 with the rotation of the rotor 4 to be inputted to the displacing amount control circuit 103. At this time, the displacing amount control circuit 103 counts the pulse signal from the sensor 82, and calculates the rotational amount of the rotor 4 based on the count value. Further, a rotational speed of the rotor 4 can be obtained based on the pulse cycle from the sensor 82 or the number of pulses within a predetermined time.

The displacing amount control circuit 103 compares the rotational amount of the rotor 4 detected by the rotary encoder 8 with the instructed target rotational amount of the rotor 4, and controls the rotation (drive) of the rotor 4 so that the detected rotational amount corresponds with the target rotational amount.

In this way, as shown in FIG. 1, the rotor 4 rotates in the normal direction (clockwise) A1 or the reverse direction (counterclockwise) A2 by a predetermined amount. In other, words, the robot arm body 200 is driven so as to rotate in a clockwise direction C1 or a counterclockwise direction C2 by a predetermined amount.

In this regard, the displacing amount detecting means is not limited to an optical detecting means such as the rotary encoder 8 described above, and may be magnetic detecting means.

Next, a description will be given for an operation of the above-mentioned drive unit 1.

When a rotational direction A of the rotor 4 is instructed to the switching circuit 9 in the ON state of a power switch (not shown in the drawings), the first and second transfer switch portions 90A, 90B operate simultaneously in response to the instruction. Further, when a rotational amount of the rotor 4 is instructed to the displacing control circuit 103 in the drive circuit 10, the amplification circuit 102 and the like are controlled in response to the instruction.

In the case where it is instructed that the rotational direction A of the rotor 4 is a clockwise direction (the normal direction A1), the terminal 91 is connected to the switching terminal 93 in the first transfer switch portion 90A, and the terminal 94 is connected to the switching terminal 96 in the second transfer switch portion 90B. By the switch of the switching circuit 9, the output side of the amplification circuit 102 in the drive circuit 10 is conducted to the second group electrodes 58 of the vibrating element 50, and the first group electrodes 57 is conducted to the input side of the oscillating circuit 101 in the drive circuit 10. Thus, the AC voltage outputted from the oscillating circuit 101 is controlled so as to be amplified in the amplification circuit 102 based on the instruction from the displacing amount control circuit 103.

In this way, the AC voltage amplified by the amplification circuit 102 is applied between the electrodes 52b, 52d, 56b, and 56d constituting the second group electrodes 58 and the reinforcing plate 54. This makes each of the portions of the first and second piezoelectric elements 53, 55 corresponding to the electrodes 52b, 52d, 56b, and 56d undergo expansion and contraction repeatedly, whereby the first and second piezoelectric elements 53, 55 and the reinforcing plate 54 undergo bending vibration. The bending vibration of the first and second piezoelectric elements 53, 55 and the reinforcing plate 54 makes the protruding portion 51 undergo back-and-forth vibration (reciprocate) in a slanting direction against the longitudinal direction B or vibrate in an elliptical manner. By the vibration of the protruding portion 51, frictional force (pushing force) is applied to the rotor 4, whereby the rotor 4 is rotatively driven directly. Namely, the rotor 4 frictionally slides against the protruding portion 51 by means of the vibration of the protruding portion 51, whereby the rotor 4 rotates in the clockwise direction (the normal direction A1). Further, by the rotation of the rotor 4, the robot arm body 200 rotates in the counterclockwise direction C2 (see FIG. 1).

At this time, the first group electrodes 57 are in a non-driving state (inactivated state). Each of the electrodes 52a, 52c, 56a, and 56c constituting the first electrodes 57 becomes a detecting electrode (vibration detecting means), a voltage (induced voltage) is induced between each of the electrodes 52a, 52c, 56a, and 56c and the reinforcing plate 54. The induced voltage is inputted to the oscillating circuit 101 as a detected voltage. The oscillating circuit 101 outputs an AC voltage having a predetermined frequency (resonant frequency) at which amplitude of the vibrating element 50 becomes maximum, i.e., the detected voltage becomes maximum. This makes it possible to rotate the rotor 4 with high efficiency.

The displacing control circuit 103 controls the conduction to each of the group electrodes 57, 58 based on the detected value ($\theta$m: actual measurement) by means of the rotary encoder (displacing amount detecting means) 8 and the rotational amount ($\theta$: target value) instructed in advance.

In other words, as described above, when a pulse signal is inputted to the displacing amount control circuit 103 from the rotary encoder 8, the displacing amount control circuit 103 counts the inputted pulses, and calculates the rotational amount ($\theta$m) of the rotor 4 based on the count value (the number of pulses). Then, the displacing amount control circuit 103 compares the actual measurement ($\theta$m) of the rotational amount with the target value ($\theta$) for the rotational amount of the rotor 4 that is instructed in advance to obtain a difference between these values (i.e., $\theta-\theta$m). The rotor 4 is rotatively driven in cooperation with the vibrating elements 50 of the actuators 5A, 5B until the actual measurement ($\theta$m) of the rotor 4 corresponds with the pre-instructed target value ($\theta$) of the rotor 4, namely, until there is no difference between the actual measurement ($\theta$m) and the target value ($\theta$) of the rotor 4 (i.e., $\theta-\theta$m=0)

On the other hand, in the case where it is instructed that the rotational direction A of the rotor 4 is a counterclockwise direction (the reverse direction A2), the terminal 91 is connected to the switching terminal 92 in the first transfer switch portion 90A, and the terminal 94 is connected to the switching terminal 95 in the second transfer switch portion 90B. By the switch of the switching circuit 9, the output side of the amplification circuit 102 in the drive circuit 10 is conducted to the first group electrodes 57 of the vibrating element 50, and the second group electrodes 58 is conducted to the input side of the oscillating circuit 101 in the drive circuit 10. Since the following operation is the same as that in the case where it is instructed that the rotational direction A of the rotor 4 is a clockwise direction (the normal direction A1) mentioned above, this description will be omitted.

The drive unit 1 of the present embodiment has a first cooperation mode in which the first and second actuators 5A, 5B are synchronized to rotatively drive the rotor (driven element) 4, a second cooperation mode in which the rotor 4 is rotatively driven with a phase difference between the first and second actuators 5A, 5B, and a third cooperation mode in which the first and second actuators 5A, 5B carry out a differential motion to rotatively drive the rotor 4.

The third cooperation mode includes a first differential motion mode in which the first and second actuators 5A, 5B respectively have drive speeds that are different from each other to drive the rotor 4 in a same direction, a second differential motion mode in which one of the first and second actuators 5A, 5B is driven in the direction reverse to the rotational direction (drive direction) of the rotor 4, and a third differential motion mode in which one of the first and second actuators 5A, 5B is in a non-driving (inactivated) state.

When the rotational drive of the rotor 4 (robot arm body 200) is controlled by means of the drive unit 1, the drive unit 1 select one or more mode(s) in the above-mentioned modes to carry out the selected mode(s). This makes it possible to carry out the rotational drive of the rotor 4 (robot arm body 200) suitably. In this regard, in the case where two or more modes are selected, there are two cases i.e., a case of carrying out these modes simultaneously and a case of carrying out these modes separately (with different timings).

In the first cooperation mode, the synchronization of the first and second actuators 5A, 5B makes it possible to increase (double) a drive torque in comparison with a case of driving a single actuator, whereby it is possible to adjust the drive torque in response to increase in a load of the robot arm body 200 easily.

In the second cooperation mode, the phase difference between the first and second actuators 5A, 5B makes it possible to compensate (increase) the drive torque. In other words, by driving one of the first and second actuators 5A, 5B, and driving the other with a different phase when the drive torque of the one actuator reaches the limiting value, it is possible to compensate the drive torque.

In the third cooperation mode, the first and second actuators 5A, 5B carry out the differential motion each other, thereby generating a countervailing power between the first and second actuators 5A, 5B. Namely, a difference between drive velocities of the first and second actuators 5A, 5B in the first differential motion mode, the reverse direction drive of one of the first and second actuators 5A, 5B in the second differential motion mode, or the non-driving (inactivated) state of one of the first and second actuators 5A, 5B in the third differential motion mode causes the countervailing power between the first and second actuators 5A, 5B. Therefore, it is possible to prevent shakiness due to backlash or the like (for example, shakiness during a normal drive or shakiness at normal-reverse converting time), and it is possible to rotatively move the rotor 4 toward a target position accurately. Further, in the second differential motion mode, it is also possible to decelerate or brake the rotation of the rotor 4 easily and surely.

Further, it is preferable that the drive unit 1 is adapted so that, when the rotor 4 is stopped, it is set to the third cooperation mode, and the rotor 4 is rotatively driven by making the first and second actuators 5A, 5B carry out differential motion (in particular, it is set to the second differential motion mode to drive one of the first and second actuators 5A, 5B in the reverse direction), and then the first and second actuators 5A, 5B that were in the drive state are stopped.

This makes a countervailing power be generated between the first and second actuators 5A, 5B. Thus, it is possible to prevent shakiness due to backlash or the like, and it is also possible to rotatively move the driven element toward a target position accurately. In particular, in the case where it is set to the second differential motion mode, it is possible to decelerate or brake (stop) the rotation of the driven element easily and surely.

Further, in the drive unit 1, an output characteristic of the first actuator 5A may be the same as or different from that of the second actuator 5B.

For example, one of the first and second actuators 5A, 5B can be used as a main actuator having a large output characteristic, and the other can be used as a sub actuator having a small output characteristic.

In this case, it is preferable that the main and sub actuators are adapted to carry out a differential motion with each other to rotatively drive the rotor 4 while it is to set to the third cooperation mode.

This makes a countervailing power be generated between the main and sub actuators. Thus, it is possible to prevent shakiness due to backlash or the like, and it is also possible to rotatively move the driven element toward a target position accurately.

Further, it is preferable that the drive unit 1 is adapted so that, when the rotor 4 is stopped, it is set to the second differential motion mode to drive the sub actuator in the reverse direction, and then the main and sub actuators that were in the drive state are stopped.

This makes it possible to decelerate or brake the rotation of the rotor 4 easily and surely.

FIGS. 6–9 are flowcharts each showing a typical concrete example of the drive control of the rotor 4. These examples include that for a predetermined mode in the cooperation modes mentioned above. Hereinafter, a description will be given for the drive control of the rotor 4 (the robot arm body 200) with reference to FIGS. 6–9.

Figure 6:
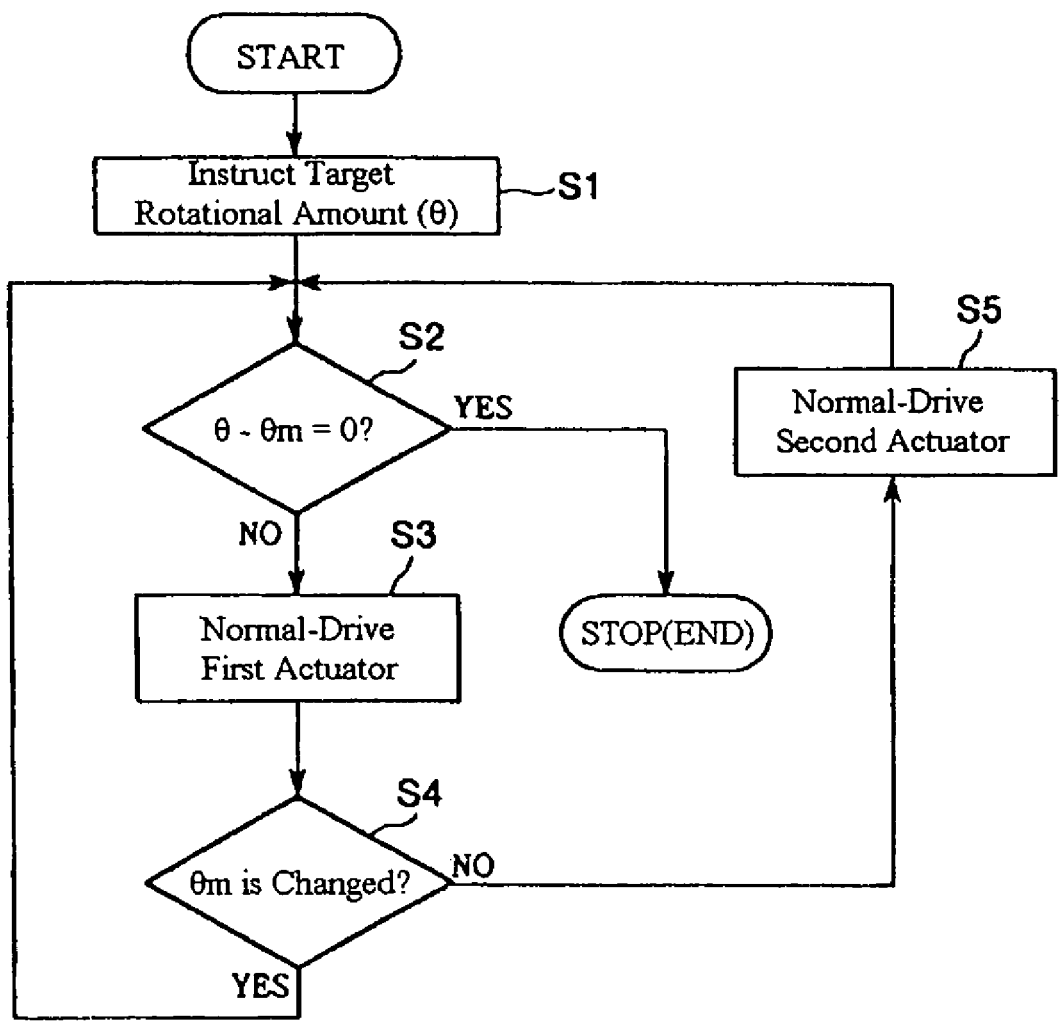
FIG. 6 is a flowchart showing a control operation of the drive unit shown in FIG. 1.

FIG. 6 is a flowchart showing the drive control of the rotor 4, which includes first and second cooperation mode in which the first and second actuators 5A, 5B are synchronized with a phase difference between the first and second actuators 5A, 5B, and a third cooperation mode in which the first and second actuators 5A, 5B carry out a differential motion mode with each other, namely, a third differential motion mode in which the second actuator 5B is in the non-driving state.

First, at step S1, a rotational direction A of the rotor 4, for example, a normal direction A1 is instructed to the switching circuit 9 in the drive circuit 10 in advance. Further, a target rotational amount ($\theta$) for the rotor 4, namely, a target rotational amount ($\theta$) for the robot arm body 200 is instructed to the displacing amount control circuit 103 in advance. Next, this operation proceeds to step S2.

At step S2, it is determined whether or not there is a difference between a rotational amount ($\theta m$) of the rotor 4 inputted from the rotary encoder 8 that measures actual rotational drive of the rotor 4 and the target rotational amount ($\theta$) of the rotor 4. In other words, it is determined whether or not a rotational position of the rotor 4 reaches a proper rotational position that is a target value (θ), namely, whether or not the robot arm body 200 reaches a target position.

In the case where it is determined that there is a difference between the actual measurement (θm) of the rotational amount of the rotor 4 and the target value (θ) (i.e., the value (θ−θm) is not zero) at step S2, this operation proceeds to step S3.

At step S3, the first actuator 5A is driven based on the instructions that are instructed at step S1. Namely, the vibrating element 50 of the first actuator 5A is driven in response to the applied voltage controlled by the oscillating circuit 101 and the amplification circuit 102, thereby rotatively driving (normal-rotating) the rotor 4 in the normal direction A1. At this time, the vibrating element 50 of the second actuator 5B is maintained in a non-driving state (inactivated state). Therefore, when the rotor 4 is rotated, the protruding portion 51 of the second actuator 5B that abuts on the outer circumferential surface of the rotor 4 in a pressure-pushing state slides on the outer circumferential surface of the rotor 4 while applying a frictional force to the surface in the direction reverse to the direction in which the first actuator 5A applies to the rotor 4. This makes a countervailing power against the rotational force in the rotational direction A1 to be generated on the rotor 4. The countervailing power makes it possible to prevent shakiness of the rotor 4 and the robot arm body 200 (for example, shakiness due to backlash or the like), and to carry out positioning of the robot arm body 200 accurately.

Next, this operation proceeds to step S4. At step S4, it is determined whether or not there is a change in the rotational amount (θm) of the rotor 4, namely, whether or not the rotation of the rotor 4 is stopped.

In the case where it is determined that there is a change in the rotational amount (θm) of the rotor 4 at step S4, this operation returns to step S2, and the same process after step S2 mentioned above is carried out.

Then, in the case where it is determined that there is no difference between the actual measurement (θm) of the rotational amount of the rotor 4 and the target value (θ) (i.e., θ−θm=0) at step S2, the drive of the first actuator 5A is stopped, thereby stopping the rotor 4. Thus, the rotational position of the rotor 4 reaches a proper rotational position that is a target value (θ), and the robot arm body 200 is positioned at the target position. Further, each of the protruding portions 51 of the first and second actuators 5A, 5B abuts on the outer circumferential surface of the rotor 4 in a pressure-pushing state, whereby the rotation of the rotor 4 is prevented and the robot arm body 200 is held at the target position.

On the other hand, in the case where it is determined that there is no change in the rotational amount (θm) of the rotor 4 at step S4, for example, in the case where the rotor 4 is not activated (started), or in the case where the rotor 4 is stopped due to some kind of cause, this operation proceeds to step S5. In this case, causes by which it is determined that there is no change in the rotational amount (θm) of the rotor 4 include a case where a drive torque (driving force) by the first actuator 5A cannot bear a load of the robot arm body 200 and the rotor 4 is temporarily stopped due to lack of the drive torque of the first actuator 5A, and the like, for example.

At step S5, the vibrating element 50 of the second actuator 5B is driven in response to the applied voltage controlled by the oscillating circuit 101 and the amplification circuit 102 so as to synchronize with the drive of the first actuator 5A. The drive of the second actuator 5B compensates the drive torque, thereby increasing (doubling) the drive torque to the rotor 4. This makes it possible to resolve the lack of the drive torque of the rotor 4 to the load of the robot arm body 200, and rotatively drive the rotor 4 while the first and second actuators 5A, 5B synchronize with each other. Next, this operation returns to step S2 again, and the same process after step S2 mentioned above is carried out.

Then, in the case where it is determined that there is no difference between the actual measurement (θm) of the rotational amount of the rotor 4 and the target value (θ) (i.e., θ−θm=0) at step S2, the drives of the first and second actuators 5A, 5B are stopped, thereby stopping the rotor 4.

On the other hand, in the case where it is determined that there is a difference between the actual measurement (θm) of the rotational amount of the rotor 4 and the target value (θ) (i.e., the value (θ−θm) is not zero) at step S2 and it is determined that there is no change in the rotational amount (θm) of the rotor 4 at step S4, the first and second actuators 5A, 5B keep driving with a synchronizing state, for example, until an instruction for stop is received.

The case where an initial rotational direction A of the rotor 4 is set to the normal direction A1 to rotate the robot arm body 200 in a clockwise direction C1 (see FIG. 1) was described. Contrary to this description, in the case where the robot arm body 200 is rotated in a counterclockwise direction C2 (see FIG. 1), the initial rotational direction A of the rotor 4 is set to the reverse direction A2. In this regard, since the drive operation of the case where the initial rotational direction A of the rotor 4 is set to the reverse direction A2 is the same as that opposite to the drive operation of the case where it is set to the normal direction A1, a description for this operation is omitted.

Here, the rotor 4 may be rotatively driven with a difference between the drive velocities of the first and second actuators 5A, 5B at step S5. This makes a countervailing power be generated on the rotor 4. The countervailing power makes it possible to prevent shakiness of the rotor 4 and the robot arm body 200, and to carry out positioning of the robot arm body 200 accurately.

Further, an output characteristic of the first actuator 5A may be the same as or different from that of the second actuator 5B.

Moreover, the first actuator 5A that is started first may be used as a main actuator having a large output characteristic, and the second actuator 5B that is started second may be used as a sub actuator having a small output characteristic.

Figure 7:
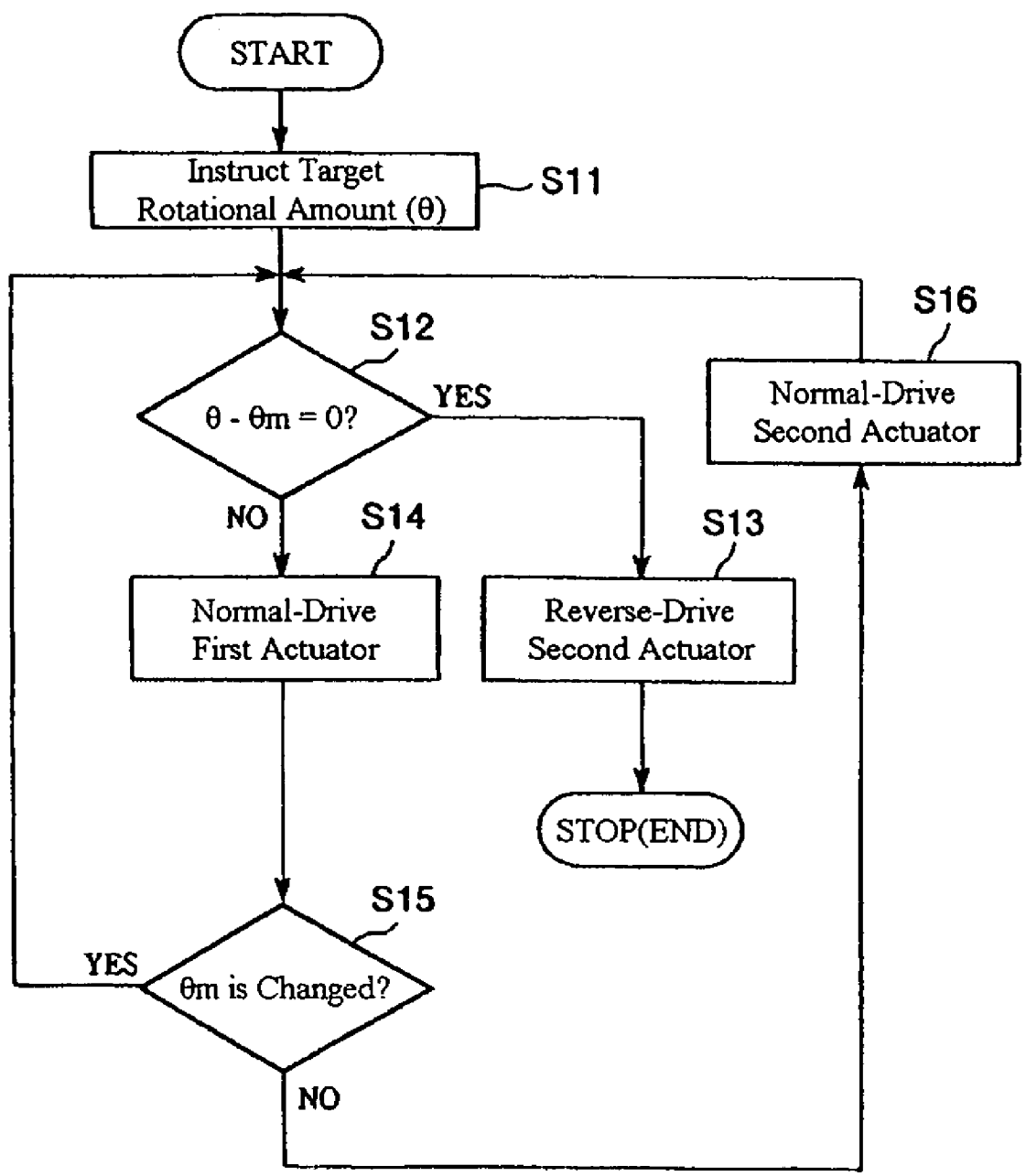
FIG. 7 is a flowchart showing a control operation of the drive unit shown in FIG. 1.

FIG. 7 is a flowchart showing the drive control of the rotor 4, which includes first and second cooperation mode in which the first and second actuators 5A, 5B are synchronized with a phase difference between the first and second actuators 5A, 5B, and a third cooperation mode in which the first and second actuators 5A, 5B carry out a differential motion mode with each other, namely, a second differential motion mode in which the second actuator 5B is driven in the reverse direction and a third differential motion mode in which the second actuator 5B is in the non-driving state.

In a similar manner to the drive control of the rotor 4 shown in FIG. 6, first, at step S11, a rotational direction A of the rotor 4, for example, a normal direction A1 is instructed to the switching circuit 9 in the drive circuit 10 in advance. Further, a target rotational amount (θ) for the rotor 4, namely, a target rotational amount (θ) for the robot arm body 200 is instructed to the displacing amount control circuit 103 in advance. Next, this operation proceeds to step S12.

At step S12, it is determined whether or not there is a difference between a rotational amount (θm) of the rotor 4 inputted from the rotary encoder 8 that measures actual rotational drive of the rotor 4 and the target rotational amount (θ) of the rotor 4. In other words, it is determined whether or not a rotational position of the rotor 4 reaches a proper rotational position that is a target value (θ), namely, whether or not the robot arm body 200 reaches a target position.

In the case where it is determined that there is a difference between the actual measurement (θm) of the rotational amount of the rotor 4 and the target value (θ) (i.e., the value (θ−θm) is not zero) at step S12, this operation proceeds to step S13.

At step S14, the first actuator 5A is driven based on the instructions that are instructed at step S11. Namely, the vibrating element 50 of the first actuator 5A is driven in response to the applied voltage controlled by the oscillating circuit 101 and the amplification circuit 102, thereby rotatively driving (normal-rotating) the rotor 4 in the normal direction A1. At this time, the vibrating element 50 of the second actuator 5B is maintained in a non-driving state (inactivated state). Therefore, when the rotor 4 is rotated, the protruding portion 51 of the second actuator 5B that abuts on the outer circumferential surface of the rotor 4 in a pressure-pushing state slides on the outer circumferential surface of the rotor 4 while applying a frictional force to the surface in the direction reverse to the direction in which the first actuator 5A applies to the rotor 4. This makes a countervailing power against the rotational force in the rotational direction A1 to be generated on the rotor 4. The countervailing power makes it possible to prevent shakiness of the rotor 4 and the robot arm body 200, and to carry out positioning of the robot arm body 200 accurately.

Next, this operation proceeds to step S15. At step S15, it is determined whether or not there is a change in the rotational amount (θm) of the rotor 4, namely, whether or not the rotation of the rotor 4 is stopped.

In the case where it is determined that there is a change in the rotational amount (θm) of the rotor 4 at step S15, this operation returns to step S12, and the same process after step S12 mentioned above is carried out.

Then, in the case where it is determined that there is no difference between the actual measurement (θm) of the rotational amount of the rotor 4 and the target value (θ) (i.e., θ−θm=0) at step S12, this operation proceeds to step S13.

The vibrating element 50 of the second actuator 5B is driven in response to the applied voltage controlled by the oscillating circuit 101 and the amplification circuit 102 in the direction opposite to the drive direction of the vibrating element 50 of the first actuator 5A. Thus, the second actuator 5B applies the drive torque toward the reverse direction A2 to the rotor 4.

Then, the drives of the first and second actuators 5A, 5B are stopped, whereby stopping the rotor 4. Thus, the rotational position of the rotor 4 reaches a proper rotational position that is a target value (θ), and the robot arm body 200 is positioned at the target position. Further, each of the protruding portions 51 of the first and second actuators 5A, 5B abuts on the outer circumferential surface of the rotor 4 in a pressure-pushing state, whereby the rotation of the rotor 4 is prevented and the robot arm body 200 is held at the target position.

Further, when the rotor 4 is stopped, the second actuator 5B is driven in the reverse direction to the first actuator 5A, and then the first and second actuators 5A, 5B are stopped. Thus, the countervailing power is generated on the rotor 4, thereby preventing shakiness of the rotor 4 and the robot arm body 200. This makes it possible to prevent shakiness of the rotor 4 and the robot arm body 200 due to, for example, backlash or the like when the rotor 4 is rotatively driven again. Thus, it is possible to carry out positioning of the robot arm body 200 accurately.

Moreover, since the second actuator 5B is driven in the reverse direction to the first actuator 5A, it is possible to decelerate or brake (stop) the rotation of the driven element easily and surely.

On the other hand, in the case where it is determined that there is no change in the rotational amount (θm) of the rotor 4 at step S15, for example, in the case where the rotor 4 is not activated (started), or in the case where the rotor 4 is stopped due to some kind of cause, this operation proceeds to step S16. In this case, causes by which it is determined that there is no change in the rotational amount (θm) of the rotor 4 include a case where a drive torque (driving force) by the first actuator 5A cannot bear a load of the robot arm body 200 and the rotor 4 is temporarily stopped due to lack of the drive torque of the first actuator 5A, and the like, for example.

At step S16, the vibrating element 50 of the second actuator 5B is driven in the normal direction A1 of the rotor 4 in response to the applied voltage controlled by the oscillating circuit 101 and the amplification circuit 102 so as to synchronize with the drive of the first actuator 5A. The drive of the second actuator 5B compensates the drive torque, thereby increasing (doubling) the drive torque to the rotor 4. This makes it possible to resolve the lack of the drive torque of the rotor 4 to the load of the robot arm body 200, and rotatively drive the rotor 4 while the first and second actuators 5A, 5B synchronize with each other. Next, this operation returns to step S12 again, and the same process after step S12 mentioned above is carried out.

Then, in the case where it is determined that there is no difference between the actual measurement (θm) of the rotational amount of the rotor 4 and the target value (θ) (i.e., θ−θm=0) at step S12, the normal drive of the second actuator 5B is inverted to the reverse drive at step S13. Then, the drives of the first and second actuators 5A, 5B are stopped, thereby stopping the rotor 4.

On the other hand, in the case where it is determined that there is a difference between the actual measurement (θm) of the rotational amount of the rotor 4 and the target value (θ) (i.e., the value (θ−θm) is not zero) at step S12 and it is determined that there is no change in the rotational amount (θm) of the rotor 4 at step S15, the first and second actuators 5A, 5B keep driving with a synchronizing state, for example, until an instruction for stop is received.

The case where an initial rotational direction A of the rotor 4 is set to the normal direction A1 to rotate the robot arm body 200 in a clockwise direction C1 (see FIG. 1) was described. Contrary to this description, in the case where the robot arm body 200 is rotated in a counterclockwise direction C2 (see FIG. 1), the initial rotational direction A of the rotor 4 is set to the reverse direction A2. In this regard, since the drive operation of the case where the initial rotational direction A of the rotor 4 is set to the reverse direction A2 is the same as that opposite to the drive operation of the case where it is set to the normal direction A1, a description for this operation is omitted.

Here, the rotor 4 may be rotatively driven with a difference between the drive velocities of the first and second actuators 5A, 5B at step S16. This makes a countervailing power be generated on the rotor 4. The countervailing power makes it possible to prevent shakiness of the rotor 4 and the robot arm body 200, and to carry out positioning of the robot arm body 200 accurately.

Further, an output characteristic of the first actuator 5A may be the same as or different from that of the second actuator 5B.

Moreover, the first actuator 5A that is started first may be used as a main actuator having a large output characteristic, and the second actuator 5B that is started second may be used as a sub actuator having a small output characteristic.

Figure 8:
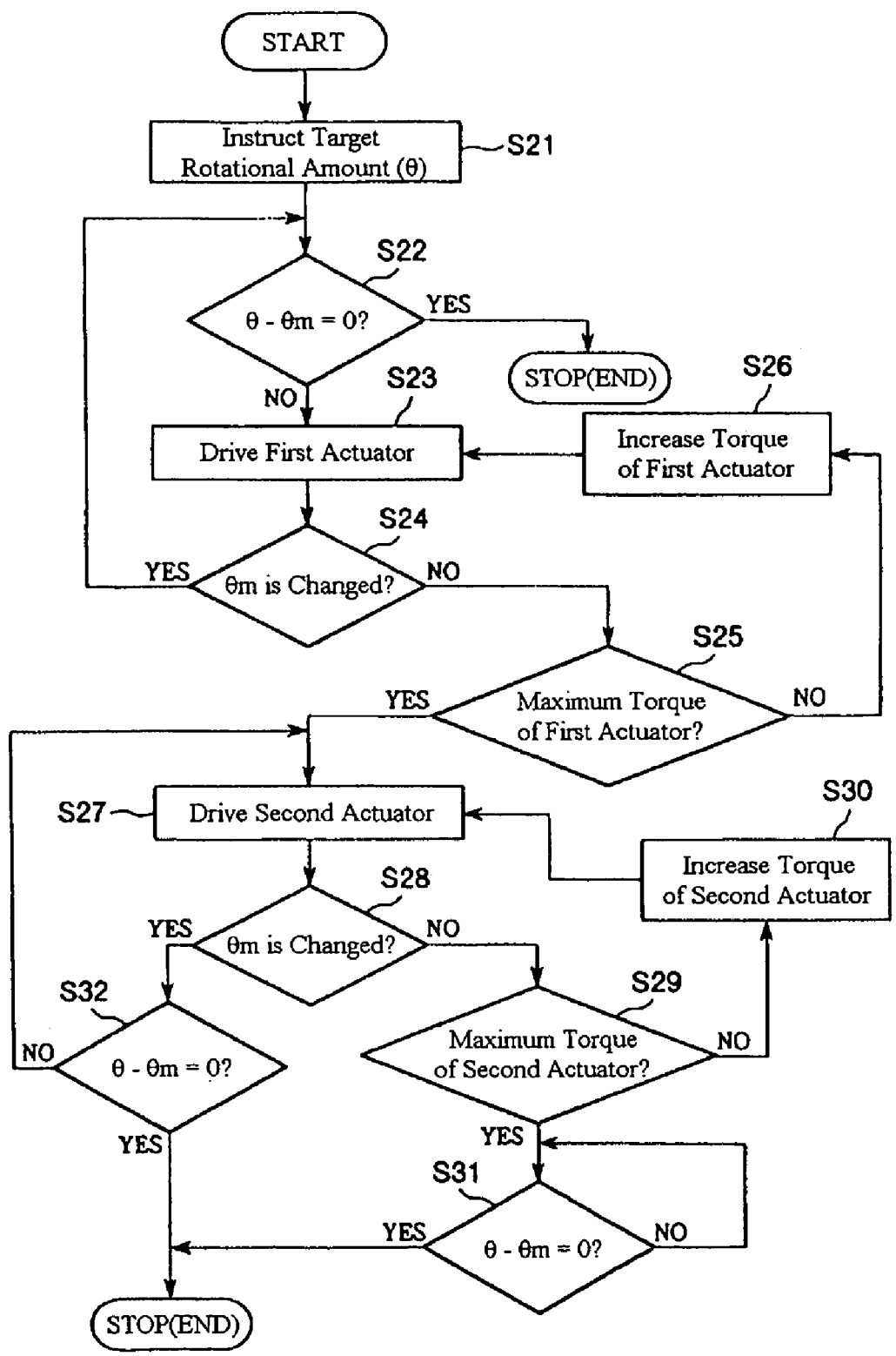
FIG. 8 is a flowchart showing a control operation of the drive unit shown in FIG. 1.

FIG. 8 is a flowchart showing the drive control of the rotor 4, which includes first and second cooperation mode in which the first and second actuators 5A, 5B are synchronized with a phase difference between the first and second actuators 5A, 5B, and a third cooperation mode in which the first and second actuators 5A, 5B carry out a differential motion mode with each other, namely, a third differential motion mode in which the second actuator 5B is in the non-driving state.

In a similar manner to the drive control of the rotor 4 shown in FIG. 6, first, at step S21, a rotational direction A of the rotor 4, for example, a normal direction A1 is instructed to the switching circuit 9 in the drive circuit 10 in advance. Further, a target rotational amount (θ) for the rotor 4, namely, a target rotational amount (θ) for the robot arm body 200 is instructed to the displacing amount control circuit 103 in advance. Next, this operation proceeds to step S22.

At step S22, it is determined whether or not there is a difference between a rotational amount (θm) of the rotor 4 inputted from the rotary encoder 8 that measures actual rotational drive of the rotor 4 and the target rotational amount (θ) of the rotor 4. In other words, it is determined whether or not a rotational position of the rotor 4 reaches a proper rotational position that is a target value (θ), namely, whether or not the robot arm body 200 reaches a target position.

In the case where it is determined that there is a difference between the actual measurement (θm) of the rotational amount of the rotor 4 and the target value (θ) (i.e., the value (θ−θm) is not zero) at step S22, this operation proceeds to step S23.

At step S23, the first actuator 5A is driven based on the instructions that are instructed at step S21. Namely, the vibrating element 50 of the first actuator 5A is driven in response to the applied voltage controlled by the oscillating circuit 101 and the amplification circuit 102, thereby rotatively driving (normal-rotating) the rotor 4 in the normal direction A1. At this time, the vibrating element 50 of the second actuator 5B is maintained in a non-driving state (inactivated state). Therefore, when the rotor 4 is rotated, the protruding portion 51 of the second actuator 5B that abuts on the outer circumferential surface of the rotor 4 in a pressure-pushing state slides on the outer circumferential surface of the rotor 4 while applying a frictional force to the surface in the direction reverse to the direction in which the first actuator 5A applies to the rotor 4. This makes a countervailing power against the rotational force in the rotational direction A1 to be generated on the rotor 4. The countervailing power makes it possible to prevent shakiness of the rotor 4 and the robot arm body 200, and to carry out positioning of the robot arm body 200 accurately.

Next, this operation proceeds to step S24. At step S24, it is determined whether or not there is a change in the rotational amount (θm) of the rotor 4, namely, whether or not the rotation of the rotor 4 is stopped.

In the case where it is determined that there is a change in the rotational amount (θm) of the rotor 4 at step S24, this operation returns to step S22, and the same process at steps S22–S24 mentioned above is repeatedly carried out.

Then, in the case where it is determined that there is no difference between the actual measurement (θm) of the rotational amount of the rotor 4 and the target value (θ) (i.e., θ−θm=0) at step S22, the drive of the first actuator 5A is stopped, thereby stopping the rotor 4. Thus, the rotational position of the rotor 4 reaches a proper rotational position that is a target value (θ), and the robot arm body 200 is positioned at the target position. Further, each of the protruding portions 51 of the first and second actuators 5A, 5B abuts on the outer circumferential surface of the rotor 4 in a pressure-pushing state, whereby the rotation of the rotor 4 is prevented and the robot arm body 200 is held at the target position.

On the other hand, in the case where it is determined that there is no change in the rotational amount (θm) of the rotor 4 at step S24, for example, in the case where the rotor 4 is not activated (started), or in the case where the rotor 4 is stopped due to some kind of cause, this operation proceeds to step S25. In this case, causes by which it is determined that there is no change in the rotational amount (θm) of the rotor 4 include a case where a drive torque (driving force) by the first actuator 5A cannot bear a load of the robot arm body 200 and the rotor 4 is temporarily stopped due to lack of the drive torque of the first actuator 5A, and the like, for example.

At step S25, it is determined whether or not the drive torque of the first actuator 5A is a maximum torque. In the case where it is determined that the drive torque of the first actuator 5A is not the maximum torque at step S25, this operation proceeds to step S26.

At step S26, an applied voltage to the first actuator 5A is increased by one step. This causes the drive torque of the first actuator 5A to be increased by one step. Next, this operation returns to step S23, and the same process after step S23 mentioned above is carried out.

Then, the applied voltage to the first actuator 5A is stepwise increased at step S26 until it is determined that there is a change in the rotational amount (θm) of the rotor 4 at step S24 or that the drive torque of the first actuator 5A is the maximum torque at step S25. This makes it possible to increase the drive torque of the first actuator 5A stepwise.

In the case where it is-determined that the drive torque of the first actuator 5A is the maximum torque at step S25, this operation proceeds to step S27. In other words, in the case where, even though the drive torque of the first actuator 5A becomes the maximum torque, the rotor 4 cannot be rotatively driven, this operation proceeds to step S27.

At step S27, the vibrating element 50 of the second actuator 5B is driven in response to the applied voltage controlled by the oscillating circuit 101 and the amplification circuit 102 so as to synchronize with the drive of the first actuator 5A, and then this operation proceeds to step S28. At step S28, it is determined whether or not there is a change in the rotational amount (θm) of the rotor 4, namely, whether or not the rotation of the rotor 4 is stopped.

In the case where it is determined that there is no change in the rotational amount (θm) of the rotor 4 at step S28, this operation proceeds to step S29. Namely, in the case where it is impossible to resolve a stopping state of the rotor 4 due to a lack of the drive torque even though the drive torque of the second actuator 5B is added to the maximum drive torque of the first actuator 5A, this operation proceeds to step S29.

At step S29, it is determined whether or not the drive torque of the second actuator 5B is a maximum torque. In the case where it is determined that the drive torque of the second actuator 5B is not the maximum torque at step S29, this operation proceeds to step S30.

At step S30, an applied voltage to the second actuator 5B is increased by one step. This causes the drive torque of the second actuator 5B to be increased by one step. Next, this operation returns to step S27, and the same process after step S27 mentioned above is carried out.

Then, the applied voltage to the second actuator 5B is stepwise increased at step S30 until it is determined that there is a change in the rotational amount (θm) of the rotor 4 at step S28 or that the drive torque of the second actuator 5B is the maximum torque at step S29. This makes it possible to increase the drive torque of the second actuator 5B stepwise. Namely, repeating the process at steps S27–S30 makes it possible to increase the drive torque by means of the second actuator (sub actuator) 5B stepwise even though the drive torque of the first actuator (main actuator) 5A reaches its limit.

On the other hand, in the case where it is determined that there is a change in the rotational amount (θm) of the rotor 4 at step S28, this operation proceeds to step S32.

At step S32, it is determined whether or not there is a difference between a rotational amount (θm) of the rotor 4 inputted from the rotary encoder 8 that measures actual rotational drive of the rotor 4 and the target rotational amount (θ) of the rotor 4. In other words, it is determined whether or not a rotational position of the rotor 4 reaches a proper rotational position that is a target value (θ), namely, whether or not the robot arm body 200 reaches a target position.

In the case where it is determined that there is no difference between the actual measurement (θm) of the rotational amount of the rotor 4 and the target value (θ) (i.e., θ−θm=0) at step S32, the drives of the first and second actuators 5A, 5B are stopped, thereby stopping the rotor 4.

On the other hand, in the case where it is determined that there is a difference between the actual measurement (θm) of the rotational amount of the rotor 4 and the target value (θ) (i.e., the value (θ−θm) is not zero) at step S32, this operation returns to step S27 again, and the same process after step S27 mentioned above is repeatedly carried out. Then, in the case where it is determined that there is no difference between the actual measurement (θm) of the rotational amount of the rotor 4 and the target value (θ) (i.e., θ−θm=0) at step S32, the drives of the first and second actuators 5A, 5B are stopped, thereby stopping the rotor 4.

Further, in the case where it is determined that the drive torque of the second actuator 5B is a maximum torque at step S29, namely, in the case where the rotor 4 cannot be rotated due to the lack of the drive torque even though both drive torques of the first and second actuators 5A, 5B are increased to their maximum torque, this operation proceeds to step S31.

At step S31, it is determined whether or not there is a difference between a rotational amount (θm) of the rotor 4 inputted from the rotary encoder 8 that measures actual rotational drive of the rotor 4 and the target rotational amount (θ) of the rotor 4. In other words, it is determined whether or not a rotational position of the rotor 4 reaches a proper rotational position that is a target value (θ), namely, whether or not the robot arm body 200 reaches a target position.

In the case where it is determined that there is a difference between the actual measurement (θm) of the rotational amount of the rotor 4 and the target value (θ) (i.e., the value (θ−θm) is not zero) at step S31, the drives of the first and second actuators 5A, 5B are maintained at their maximum drive torques so as to be synchronized with each other. This operation waits at step S31 until an instruction for stopping these actuators is reserved.

On the other hand, in the case where it is determined that there is no difference between the actual measurement (θm) of the rotational amount of the rotor 4 and the target value (θ) (i.e., θ−θm=0) at step S31, the drives of the first and second actuators 5A, 5B are stopped, thereby stopping the rotor 4.

The case where an initial rotational direction A of the rotor 4 is set to the normal direction A1 to rotate the robot arm body 200 in a clockwise direction C1 (see FIG. 1) was described. Contrary to this description, in the case where the robot arm body 200 is rotated in a counterclockwise direction C2 (see FIG. 1), the initial rotational direction A of the rotor 4 is set to the reverse direction A2. In this regard, since the drive operation of the case where the initial rotational direction A of the rotor 4 is set to the reverse direction A2 is the same as that opposite to the drive operation of the case where it is set to the normal direction A1, a description for this operation is omitted.

According to this drive control, since the drive torques of the first and second actuators 5A, 5B are respectively (independently) increased stepwise, it is possible to rotatively drive the rotor 4 with a minimum drive torque (i.e., a necessary and sufficient drive torque) against a load. This makes it possible to reduce power consumption of the drive unit 1.

Here, the rotor 4 may be rotatively driven with a difference between the drive velocities of the first and second actuators 5A, 5B at step S27. This makes a countervailing power be generated on the rotor 4. The countervailing power makes it possible to prevent shakiness of the rotor 4 and the robot arm body 200, and to carry out positioning of the robot arm body 200 accurately.

Further, an output characteristic of the first actuator 5A may be the same as or different from that of the second actuator 5B.

Figure 9:
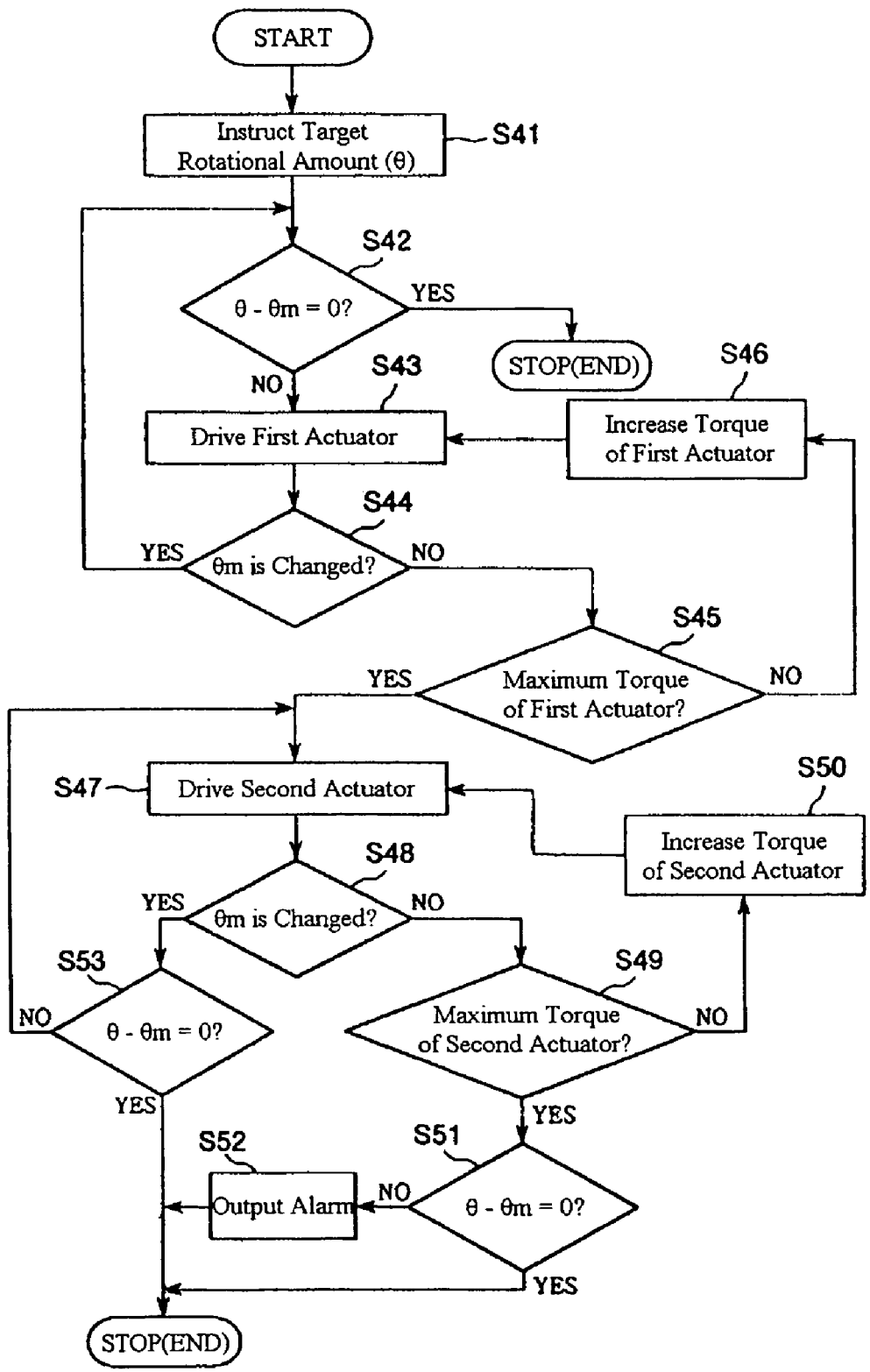
FIG. 9 is a flowchart showing a control operation of the drive unit shown in FIG. 1.

FIG. 9 is a flowchart showing the drive control of the rotor 4, which includes first and second cooperation mode in which the first and second actuators 5A, 5B are synchronized with a phase difference between the first and second actuators 5A, 5B, and a third cooperation mode in which the first and second actuators 5A, 5B carry out a differential motion mode with each other, namely, a third differential motion mode in which the second actuator 5B is in a non-driving state.

In a similar manner to the drive control of the rotor 4 shown in FIG. 8, a description will be given for a case where the first actuator 5A is used as a main actuator having a large output characteristic, and the second actuator 5B is used as a sub actuator having a small output characteristic.

First, at step S41, a rotational direction A of the rotor 4, for example, a normal direction A1 is instructed to the switching circuit 9 in the drive circuit 10 in advance. Further, a target rotational amount (θ) for the rotor 4, namely, a target rotational amount (θ) for the robot arm body 200 is instructed to the displacing amount control circuit 103 in advance. Next, this operation proceeds to step S42.

At step S42, it is determined whether or not there is a difference between a rotational amount (θm) of the rotor 4 inputted from the rotary encoder 8 that measures actual rotational drive of the rotor 4 and the target rotational amount (θ) of the rotor 4. In other words, it is determined whether or not a rotational position of the rotor 4 reaches a proper rotational position that is a target value (θ), namely, whether or not the robot arm body 200 reaches a target position.

In the case where it is determined that there is a difference between the actual measurement (θm) of the rotational amount of the rotor 4 and the target value (θ) (i.e., the value (θ−θm) is not zero) at step S42, this operation proceeds to step S43.

At step S43, the first actuator 5A is driven based on the instructions that are instructed at step S41. Namely, the vibrating element 50 of the first actuator 5A is driven in response to the applied voltage controlled by the oscillating circuit 101 and the amplification circuit 102, thereby rotatively driving (normal-rotating) the rotor 4 in the normal direction A1. At this time, the vibrating element 50 of the second actuator 5B is maintained in a non-driving state (inactivated state). Therefore, when the rotor 4 is rotated, the protruding portion 51 of the second actuator 5B that abuts on the outer circumferential surface of the rotor 4 in a pressure-pushing state slides on the outer circumferential surface of the rotor 4 while applying a frictional force to the surface in the direction reverse to the direction in which the first actuator 5A applies to the rotor 4. This makes a countervailing power against the rotational force in the rotational direction A1 to be generated on the rotor 4. The countervailing power makes it possible to prevent shakiness of the rotor 4 and the robot arm body 200, and to carry out positioning of the robot arm body 200 accurately.

Next, this operation proceeds to step S44. At step S44, it is determined whether or not there is a change in the rotational amount (θm) of the rotor 4, namely, whether or not the rotation of the rotor 4 is stopped.

In the case where it is determined that there is a change in the rotational amount (θm) of the rotor 4 at step S44, this operation returns to step S22, and the same process at steps S42–S44 mentioned above is repeatedly carried out.

Then, in the case where it is determined that there is no difference between the actual measurement (θm) of the rotational amount of the rotor 4 and the target value (θ) (i.e., θ−θm=0) at step S42, the drive of the first actuator 5A is stopped, thereby stopping the rotor 4. Thus, the rotational position of the rotor 4 reaches a proper rotational position that is a target value (θ), and the robot arm body 200 is positioned at the target position. Further, each of the protruding portions 51 of the first and second actuators 5A, 5B abuts on the outer circumferential surface of the rotor 4 in a pressure-pushing state, whereby the rotation of the rotor 4 is prevented and the robot arm body 200 is held at the target position.

On the other hand, in the case where it is determined that there is no change in the rotational amount (θm) of the rotor 4 at step S44, for example, in the case where the rotor 4 is not activated (started), or in the case where the rotor 4 is stopped due to some kind of cause, this operation proceeds to step S25. In this case, causes by which it is determined that there is no change in the rotational amount (θm) of the rotor 4 include a case where a drive torque (driving force) by the first actuator 5A cannot bear a load of the robot arm body 200 and the rotor 4 is temporarily stopped due to lack of the drive torque of the first actuator 5A, and the like, for example.

At step S45, it is determined whether or not the drive torque of the first actuator 5A is a maximum torque. In the case where it is determined that the drive torque of the first actuator 5A is not the maximum torque at step S45, this operation proceeds to step S46.

At step S46, an applied voltage to the first actuator 5A is increased by one step. This causes the drive torque of the first actuator 5A to be increased by one step. Next, this operation returns to step S43, and the same process after step S43 mentioned above is carried out.

Then, the applied voltage to the first actuator 5A is stepwise increased at step S46 until it is determined that there is a change in the rotational amount (θm) of the rotor 4 at step S44 or that the drive torque of the first actuator 5A is the maximum torque at step S45. This makes it possible to increase the drive torque of the first actuator 5A stepwise.

In the case where it is determined that the drive torque of the first actuator 5A is the maximum torque at step S45, this operation proceeds to step S47. In other words, in the case where, even though the drive torque of the first actuator 5A becomes the maximum torque, the rotor 4 cannot be rotatively driven, this operation proceeds to step S47.

At step S47, the vibrating element 50 of the second actuator 5B is driven in response to the applied voltage controlled by the oscillating circuit 101 and the amplification circuit 102 so as to synchronize with the drive of the first actuator 5A, and then this operation proceeds to step S48. At step S48, it is determined whether or not there is a change in the rotational amount (θm) of the rotor 4, namely, whether or not the rotation of the rotor 4 is stopped.

In the case where it is determined that there is no change in the rotational amount (θm) of the rotor 4 at step S48, this operation proceeds to step S49. Namely, in the case where it is impossible to resolve a stopping state of the rotor 4 due to a lack of the drive torque even though the drive torque of the second actuator 5B is added to the maximum drive torque of the first actuator 5A, this operation proceeds to step S49.

At step S49, it is determined whether or not the drive torque of the second actuator 5B is a maximum torque. In the case where it is determined that the drive torque of the second actuator 5B is not the maximum torque at step S49, this operation proceeds to step S50.

At step S50, an applied voltage to the second actuator 5B is increased by one step. This causes the drive torque of the second actuator 5B to be increased by one step. Next, this operation returns to step S47, and the same process after step S47 mentioned above is carried out.

Then, the applied voltage to the second actuator 5B is stepwise increased at step S50 until it is determined that there is a change in the rotational amount (θm) of the rotor 4 at step S48 or that the drive torque of the second actuator 5B is the maximum torque at step S49. This makes it possible to increase the drive torque of the second actuator 5B stepwise. Namely, repeating the process at steps S47–S50 makes it possible to increase the drive torque by means of the second actuator (sub actuator) 5B stepwise even though the drive torque of the first actuator (main actuator) 5A reaches its limit.

On the other hand, in the case where it is determined that there is a change in the rotational amount (θm) of the rotor 4 at step S48, this operation proceeds to step S53.

At step S53, it is determined whether or not there is a difference between a rotational amount (θm) of the rotor 4 inputted from the rotary encoder 8 that measures actual rotational drive of the rotor 4 and the target rotational amount (θ) of the rotor 4. In other words, it is determined whether or not a rotational position of the rotor 4 reaches a proper rotational position that is a target value (θ), namely, whether or not the robot arm body 200 reaches a target position.

In the case where it is determined that there is no difference between the actual measurement (θm) of the rotational amount of the rotor 4 and the target value (θ) (i.e., θ−θm=0) at step S53, the drives of the first and second actuators 5A, 5B are stopped, thereby stopping the rotor 4.

On the other hand, in the case where it is determined that there is a difference between the actual measurement (θm) of the rotational amount of the rotor 4 and the target value (θ) (i.e., the value (θ−θm) is not zero) at step S53, this operation returns to step S47 again, and the same process after step S47 mentioned above is repeatedly carried out. Then, in the case where it is determined that there is no difference between the actual measurement (θm) of the rotational amount of the rotor 4 and the target value (θ) (i.e., θ−θm=0) at step S53, the drives of the first and second actuators 5A, 5B are stopped, thereby stopping the rotor 4.

Further, in the case where it is determined that the drive torque of the second actuator 5B is a maximum torque at step S49, namely, in the case where the rotor 4 cannot be rotated due to the lack of the drive torque even though both drive torques of the first and second actuators 5A, 5B are increased to their maximum torque, this operation proceeds to step S51.

At step S51, it is determined whether or not there is a difference between a rotational amount (θm) of the rotor 4 inputted from the rotary encoder 8 that measures actual rotational drive of the rotor 4 and the target rotational amount (θ) of the rotor 4. In other words, it is determined whether or not a rotational position of the rotor 4 reaches a proper rotational position that is a target value (θ), namely, whether or not the robot arm body 200 reaches a target position.

In the case where it is determined that there is a difference between the actual measurement (θm) of the rotational amount of the rotor 4 and the target value (θ) (i.e., the value (θ−θm) is not zero) at step S51, this operation proceeds to step S52. At step S52, an alarm is outputted and the first and second actuators 5A, 5B are stopped compulsory.

By the alarm, a user can recognize that the rotor 4 is not rotated due to the lack of the drive torque even though the drive torques of the first and second actuators 5A, 5B respectively become their maximum drive torques.

Further, when the drives of the first and second actuators 5A, 5B are stopped, each of the protruding portions 51 of the first and second actuators 5A, 5B abuts on the outer circumferential surface of the rotor 4 in a pressure-pushing state, whereby the rotation of the rotor 4 is prevented and the robot arm body 200 is held at a present position.

On the other hand, in the case where it is determined that there is no difference between the actual measurement (θm) of the rotational amount of the rotor 4 and the target value (θ) (i.e., θ−θm=0) at step S51, the drives of the first and second actuators 5A, 5B are stopped, thereby stopping the rotor 4.

The case where an initial rotational direction A of the rotor 4 is set to the normal direction A1 to rotate the robot arm body 200 in a clockwise direction C1 (see FIG. 1) was described. Contrary to this description, in the case where the robot arm body 200 is rotated in a counterclockwise direction C2 (see FIG. 1), the initial rotational direction A of the rotor 4 is set to the reverse direction A2. In this regard, since the drive operation of the case where the initial rotational direction A of the rotor 4 is set to the reverse direction A2 is the same as that opposite to the drive operation of the case where it is set to the normal direction A1, a description for this operation is omitted.

According to this drive control, since the drive torques of the first and second actuators 5A, 5B are respectively (independently) increased stepwise, it is possible to rotatively drive the rotor 4 with a minimum drive torque (i.e., a necessary and sufficient drive torque) against a load. This makes it possible to reduce power consumption of the drive unit 1.

Here, the rotor 4 may be rotatively driven with a difference between the drive velocities of the first and second actuators 5A, 5B at step S47. This makes a countervailing power be generated on the rotor 4. The countervailing power makes it possible to prevent shakiness of the rotor 4 and the robot arm body 200, and to carry out positioning of the robot arm body 200 accurately.

Further, an output characteristic of the first actuator 5A may be the same as or different from that of the second actuator 5B.

As described above, the drive unit 1 rotatively drives one (single) rotor 4 (robot arm body 200) by cooperating the first and second actuators 5A, 5B, which are independent of each other. This makes it possible to change a posture or position of the robot arm body 200 arbitrarily.

In particular, since the drive unit 1 rotatively drives the rotor 4 (robot arm body 200) by cooperating the first and second actuators 5A, 5B, a large drive torque can be obtained in comparison with the case where the rotor 4 is driven by means of a single actuator. In addition, it is possible to carry out the selection and adjustment of the drive torque in response to an increase in the load of the robot arm body 200 easily and surely.

Further, since each of the first and second actuators 5A, 5B is constituted from the vibrating element 50 described above, it is possible to obtain a large torque and a large detent torque. Further, this makes it possible to miniaturize (make thinner) and make lighter the entire drive unit 1.

Moreover, since the rotor 4 is directly driven (rotated) by means of the vibrating elements 50 of the first and second actuator 5A, 5B, there is an advantage for making the unit 1 lighter and thinner. In addition, this makes it possible to reduce the number of components, and simplify the structure of the drive unit 1 extremely, and further to reduce a production cost of the drive unit 1.

Furthermore, since a vibration of the vibrating element 50 in a plane is converted to a rotary motion of the rotor 4, it is possible to reduce an energy loss in a mechanical conversion. This makes it possible to drive the rotor 4 with high efficiency.

Since the rotor 4 is rotatively driven in a frictional sliding manner by propagation of the vibration from the vibrating element 50 unless in the case of driving a rotor by means of magnetic force (for example, normal electric (electromotive) motor), the driving force to the rotor 4 becomes higher. Therefore, it is possible to drive the rotor 4 with sufficient force without using any variable speed mechanism (decelerating mechanism).

Second Embodiment

Next, a description will be given for a second embodiment of the present invention.

Figure 10:
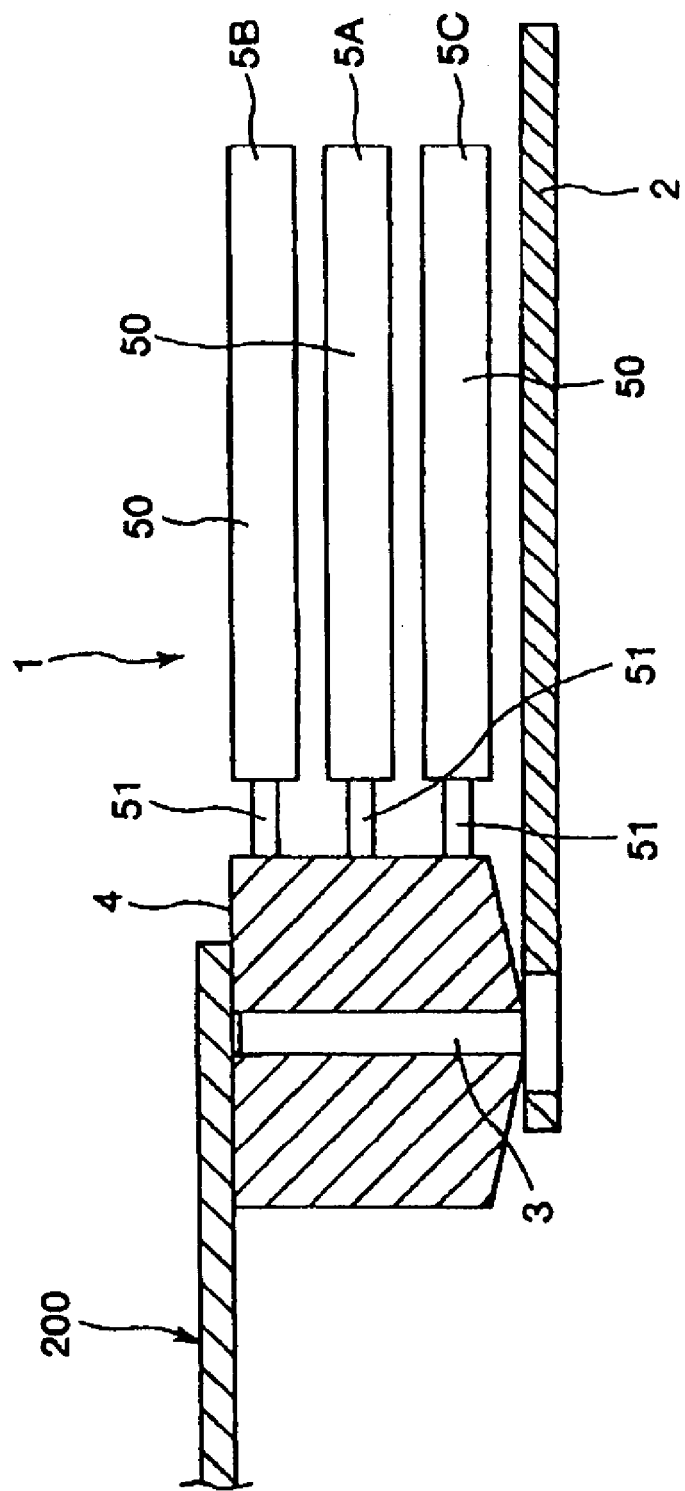
FIG. 10 is a cross-sectional view illustrating a second embodiment of the drive unit according to the present invention.

FIG. 10 is a cross-sectional view illustrating a second embodiment of the drive unit according to the present invention.

Hereinafter, a drive unit 1 in the second embodiment will be described, focusing on different points between the above-mentioned first embodiment and the second embodiment. In this regard, explanation of items including the same matters and the like is omitted.

A difference between the second embodiment and the first embodiment described above is that the drive unit 1 of the second embodiment has a third actuator 5C other than the first and second actuators 5A, 5B.

These first to third actuators 5A–5C are arranged along a direction parallel to a shaft 3 (a vertical direction (up-to-down direction) in FIG. 10).

Here, output characteristics of the first to third actuators 5A–5C may be same or different from each other.

It is preferable that, for example, the first actuator 5A is used as a main actuator having a large output characteristic, and the second and third actuators 5B, 5C are used as sub actuators each having a small output characteristic. In this case, as shown in FIG. 10, it is preferable that the first actuator 5A is arranged between the second and third actuators 5B, 5C in the vertical direction.

According to the second embodiment of the present invention, it is possible to obtain effects similar to that of the first embodiment described above.

Further, since three actuators are provided on the drive unit 1 in the second embodiment, it is possible to obtain a larger drive torque than in the first embodiment.

In this regard, the first to third actuators 5A–5C are arranged along the direction parallel to the shaft 3 in FIG. 10, but the present invention is not limited to this structure. For example, the first to third actuators 5A–5C are arranged along an outer circumferential surface (in the circumferential direction) of the rotor 4 in a same plane above a base 2 as well as the first embodiment described above. This makes it possible to make the entire unit thinner.

Third Embodiment

Next, a description will be given for a third embodiment of the present invention.

Figure 11:
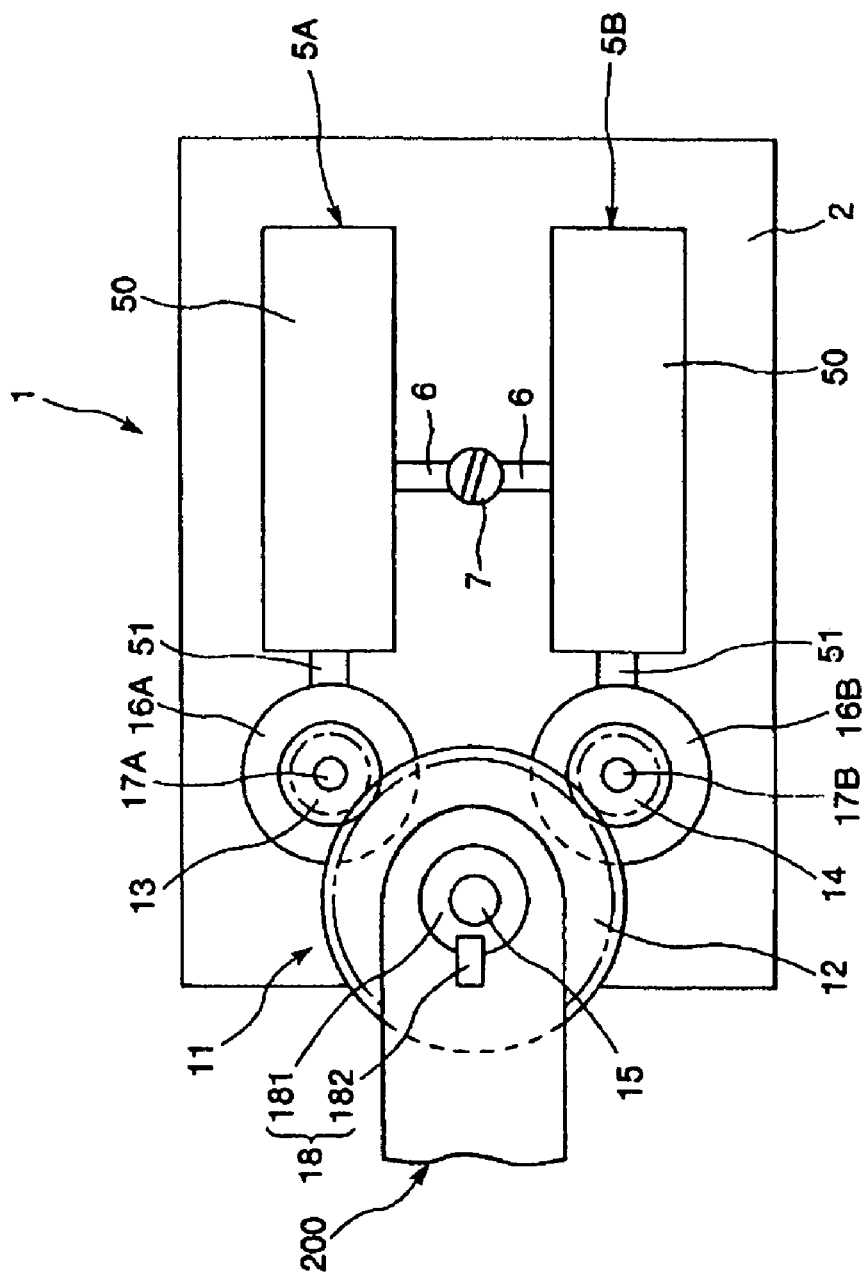
FIG. 11 is a plan view illustrating a third embodiment of the drive unit according to the present invention.

FIG. 11 is a plan view illustrating a third embodiment of the drive unit according to the present invention.

Hereinafter, a drive unit 1 in the third embodiment will be described, focusing on different points between the above-mentioned first embodiment and the third embodiment. In this regard, explanation of items including the same matters and the like is omitted.

A difference between the third embodiment and the first embodiment described above is that the drive unit 1 of the third embodiment has a decelerator (decelerating mechanism) 11, and a rotational control (drive control) for a driven element by the first and second actuators 5A, 5B, i.e., a rotational control (drive control) of a robot arm body (controlled element) 200 is indirectly carried out through the decelerator 11.

The decelerator 11 is constituted from a main gear (rotor) 12 (as the driven element) on which the robot arm body 200 is attached (joined), and first and second sub gears 13, 14 each of which engages with the main gear (rotor) 12. Each of the first and second sub gears 13, 14 has a smaller diameter than that of the main gear 12, and the number of cogs in each of the first and second sub gears 13, 14 is less than that of the main gear 12.

The main gear 12 and rotary shafts 17A, 17B are rotatably provided on the base 2 in both normal and reverse directions. The main gear 12 is fixed on the shaft 15. Further, a first rotor (moving element or displacing element) 16A and the first sub gear 13 are fixed on the rotary shaft 17A, while a second rotor (moving element or displacing element) 16B and the second sub gear 14 are fixed on the rotary shaft 17B.

The first sub gear 13 rotates integrally with the first rotor 16A, while the second sub gear 14 rotates integrally with the second rotor 16B. Thus, the main gear 12 works with (interlocks) each of the first and second rotor 16A, 16B.

A protruding portion 51 of the vibrating element 50 which constitutes a first actuator 5A abuts on (is provided in abutment with) an outer circumferential surface of the first rotor 16A in a pressure-pushing state. A protruding portion 51 of the vibrating element 50 constituting a second actuator 5B abuts on an outer circumferential surface of the first rotor 16B in a pressure-pushing state.

Further, a rotary encoder 18 is provided on the main gear 12 as rotational amount detecting means (or displacing amount detecting means) for detecting the rotational amount (or displacing amount) of the main gear 12. The rotary encoder 18 is constituted from a slit rotating plate 181, and a sensor 182 having a light emitting portion and a light receiving portion. The slit rotating plate 181 is fixed on a shaft 15.

In the drive unit 1, when the first actuator 5A is operated (activated), the first rotor 16A and the first sub gear 13 are rotated, thereby rotating the main gear 12. Similarly, when the second actuator 5B is operated (activated), the second rotor 16B and the second sub gear 14 are rotated, thereby rotating the main gear 12 and the robot arm body 200. At this time, the decelerator 11 makes rotational speed of the rotors 16A and/or 16B to be decelerated, whereby it is possible to obtain a large drive torque.

In this way, the decelerator 11 is provided in a power transmission path between the first and second rotors 16A, 16B and the main gear 12 in the third embodiment. Thus, the rotational control (drive control) of the robot arm body 200 is indirectly carried out via the decelerator 11 by means of the first and second actuators 5A, 5B.

According to the-third embodiment of the present invention, it is possible to obtain effects similar to that of the first embodiment described above.

In this regard, rotational amount detecting means (or displacing amount detecting means) for detecting the rotational amount (or displacing amount) of the first rotor 16A, and/or rotational amount detecting means (or displacing amount detecting means) for detecting the rotational amount (or displacing amount) of the second rotor 16B may be provided on the rotors 16A, 16B, respectively. For example, a rotary encoder or the like can be used as the rotational amount detecting means.

Fourth Embodiment

Next, a description will be given for a fourth embodiment of the present invention.

Figure 12:
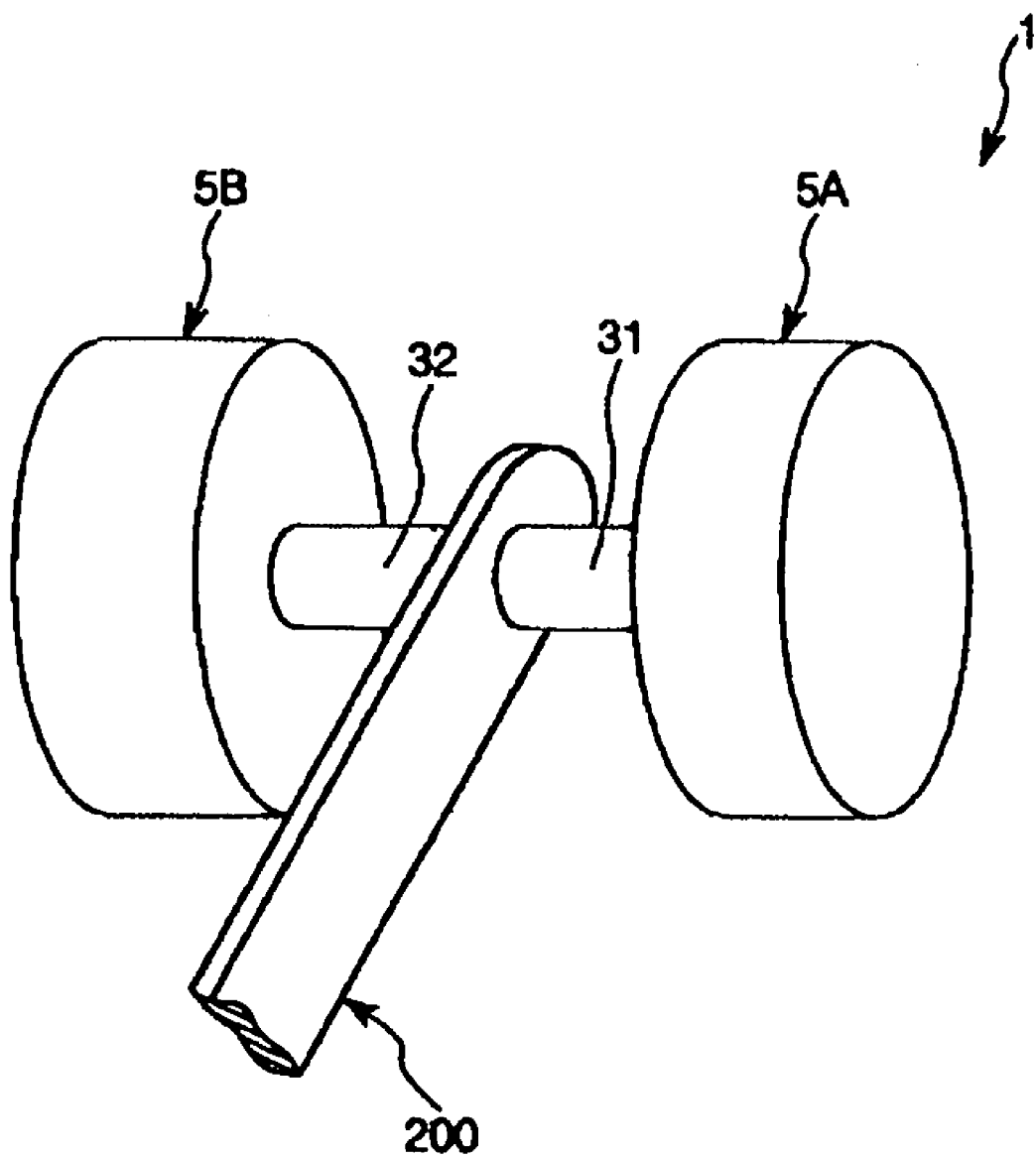
FIG. 12 is a perspective view illustrating a fourth embodiment of the drive unit according to the present invention.

FIG. 12 is a perspective view illustrating a fourth embodiment of the drive unit according to the present invention.

Hereinafter, a drive unit 1 in the fourth embodiment will be described, focusing on different points between the above-mentioned first embodiment and the fourth embodiment. In this regard, explanation of items including the same matters and the like is omitted.

A difference between the fourth embodiment and the first embodiment described above is that the drive unit 1 of the fourth embodiment utilizes electromagnetic motors (electromagnetic motor mechanisms) each having an excited coil as an electro-mechanical converting element, as the first and second actuators 5A, 5B, respectively.

A structure of the utilized electromagnetic motor is especially limited. For example, the excited coil may be provided on a rotor side, or may be provided on a stator side.

In the drive unit 1 of the fourth embodiment, a tip portion of a shaft 31 provided on the rotor of the first actuator 5A is fixed to one surface of one end side of the robot arm body 200, while a tip portion of a shaft 32 provided on the rotor of the second actuator 5B is fixed to the other surface of the one end side of the robot arm body 200. In this case, the first and second actuators 5A, 5B are assembled so that the centerline (rotational centerline) of the shaft 31 substantially corresponds with that of the shaft 32.

According to the fourth embodiment of the present invention, it is possible to obtain effects similar to that of the first embodiment described above.

Fifth Embodiment

Next, a description will be given for a fifth embodiment of the present invention.

Figure 13:
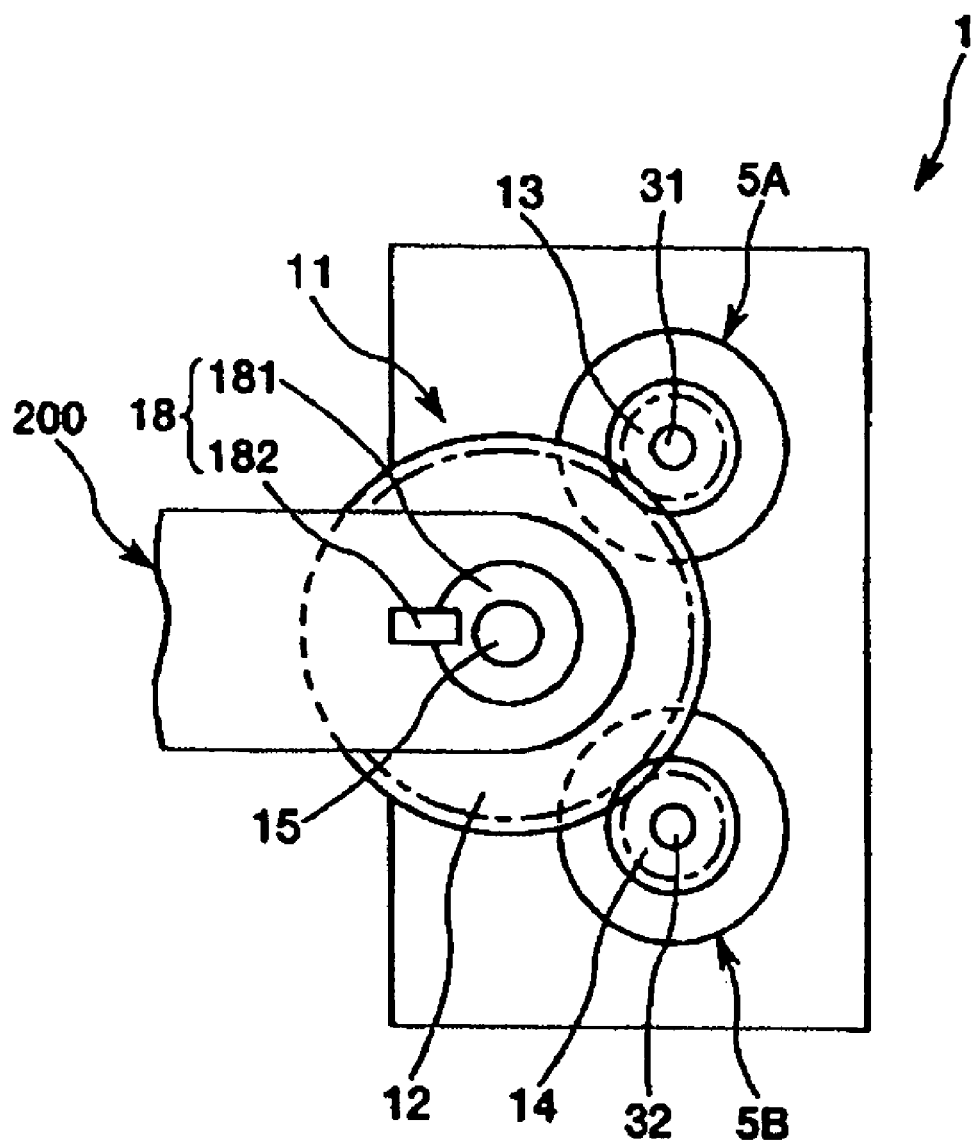
FIG. 13 is a plan view illustrating a fifth embodiment of the drive unit according to the present invention.

FIG. 13 is a plan view illustrating a fifth embodiment of the drive unit according to the present invention.

Hereinafter, a drive unit 1 in the fifth embodiment will be described, focusing on different points between the above-mentioned third embodiment and the fifth embodiment. In this regard, explanation of items including the same matters and the like is omitted.

A difference between the fifth embodiment and the third embodiment described above is that the drive unit 1 of the fifth embodiment utilizes electromagnetic motors (electromagnetic motor mechanisms) each having an excited coil as an electro-mechanical converting element, as the first and second actuators 5A, 5B, respectively.

In the drive unit 1 of the fifth embodiment, the first sub gear 13 is fixed to the tip portion of the shaft 31 provided on the rotor of the first actuator 5A, while the second sub gear 14 is fixed to the tip portion of the shaft 32 provided on the rotor of the second actuator 5B. In this case, the first and second actuators 5A, 5B are assembled so that the centerlines (rotational centerlines) of the shafts 31, 32 are spaced in a predetermined distance, and substantially parallel to each other.

According to the fifth embodiment of the present invention, it is possible to obtain effects similar to that of the third embodiment described above.

As described above, it should be noted that, even though the drive unit and the operating apparatus according to the present invention have been described with reference to the preferred embodiments shown in the accompanying drawings, the present invention is not limited to these embodiments, it is of course possible to make various changes and modifications to each element of sawtooth wave generating apparatus and the constant current circuit, and various elements described above can be replaced with any other element capable of performing the same or a similar function.

In this regard, the present invention may combine any two or more constitutions (characteristics) in the first to fifth embodiments described above.

Further, an actuator capable of driving in both normal and reverse directions is used as the actuator in the embodiments described above, but the present invention is not limited to this type. An actuator capable of driving in one direction may be used as the actuator.

Moreover, the drive unit of the present invention may be adapted so that, for example, some of the plurality of actuators drive the driven element directly and the rest of the plurality of actuators drive the driven element indirectly.

Further, in the above-mentioned embodiments, the driven element is a rotor or gear, and the driven element is adapted to be rotated by means of the driving force from the actuator. However, the present invention is not limited to these cases. For example, the driven element has a long-plate shape, and the driven element may be adapted to move in a vertical direction or linearly.

Moreover, the number of the actuators is two or three in the embodiments mentioned above, but it may be four or more in the present invention.

Furthermore, the number of the driven elements is one in the above-mentioned embodiments, but it may be two or more in the present invention.

Further, in the embodiments described above, the case where the drive unit controls the drive of the robot arm in the simplified robot has been described as an example, but the present invention is not limited to the use for the drive unit. Namely, the operating apparatus is not limited to the robot arm in the simplified robot (the driven element is not limited to the robot arm body). In other words, the operating apparatus of the present invention may be any type of apparatus Has the drive unit of the present invention and the controlled element driven by the drive unit.

Japanese patent applications no. 2003-415312 filed Dec. 12, 2003 and no. 2003-030139 filed Feb. 6, 2003 are hereby incorporated by reference.

The invention claimed is:

1. A drive unit, comprising:
two sub driven elements;
a pair of actuator units for respectively driving the two sub driven elements, each of the pair of actuator units including at least one actuator, and each actuator comprising an electro-mechanical converting element which applies driving force to the corresponding sub driven element when electric power is applied thereto;
a main driven element driven by the pair of actuator units via the two sub driven elements; and
control means for controlling the pair of actuator units so that the main driven element is driven in one of a plurality of drive modes,
wherein the plurality of drive modes includes a differential mode in which the pair of actuator units carry out a differential motion with each other to drive the main driven element via the two sub driven elements.

2. The drive unit as claimed in claim 1, wherein the differential mode includes at least one of a first differential motion mode in which the pair of actuator units respectively have drive speeds that are different from each other to drive the main driven element in a same direction, a second differential motion mode in which one of the pair of actuator units is driven in the direction reverse to the drive direction of the main driven element, and a third differential motion mode in which one of the pair of actuator units is in a suspending state.

3. The drive unit as claimed in claim 1, wherein the control means drives the pair of actuator units in the differential mode in order to stop the main driven element.

4. The drive unit as claimed in claim 1, wherein the main driven element and the two sub driven elements constitute a decelerator.

5. The drive unit as claimed in claim 1, further comprising rotational amount detecting means for detecting the rotational amount of the main driven element, wherein the control means controls the pair of actuator units in response to the rotational amount of the main driven element detected by the rotational amount detecting means.

6. The drive unit as claimed in claim 5, wherein the rotational amount detecting means include a rotary encoder.

7. The drive unit as claimed in claim 1, wherein each of the two sub driven elements has a shaft for rotation and the at least one actuator in each of the pair of actuator units includes a plurality of actuators, wherein the plurality of actuators are arranged along the shaft of the corresponding sub driven element.

8. The driven unit as claimed in claim 1, wherein the electro-mechanical converting element is a vibrating element containing a piezoelectric material.

9. An operating apparatus, comprising:

the drive unit of claim 1; and a controlled element driven by the drive unit in a controlled manner.

10. The operating apparatus as claimed in claim 9, wherein the controlled element includes a robot arm body.

* * * * *